US012111562B2

(12) United States Patent
Kayano et al.

(10) Patent No.: US 12,111,562 B2
(45) Date of Patent: Oct. 8, 2024

(54) PROJECTION DEVICE

(71) Applicant: FUJIFILM Corporation, Tokyo (JP)

(72) Inventors: Hironobu Kayano, Saitama (JP); Shoki Kasahara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 104 days.

(21) Appl. No.: 17/540,473

(22) Filed: Dec. 2, 2021

(65) Prior Publication Data

US 2022/0091491 A1 Mar. 24, 2022

Related U.S. Application Data

(63) Continuation of application No. PCT/JP2020/023078, filed on Jun. 11, 2020.

(30) Foreign Application Priority Data

Jun. 28, 2019 (JP) .................................. 2019-121324

(51) Int. Cl.
*G03B 21/14* (2006.01)
*G03B 21/00* (2006.01)
(Continued)

(52) U.S. Cl.
CPC ......... *G03B 21/145* (2013.01); *G03B 21/006* (2013.01); *G03B 21/142* (2013.01);
(Continued)

(58) Field of Classification Search
CPC .............. G03B 21/145; G03B 21/142; G03B 21/2033; G03B 21/2066; G03B 21/2073;
(Continued)

(56) References Cited

U.S. PATENT DOCUMENTS

2004/0095559 A1* 5/2004 Arai .................... H04N 9/3144
353/57
2007/0146651 A1 6/2007 Lee et al.
(Continued)

FOREIGN PATENT DOCUMENTS

JP 2014-112258 A 6/2014
JP 2019-21734 A 2/2019
(Continued)

OTHER PUBLICATIONS

International Preliminary Report on Patentability and English translation of the Written Opinion of the International Searching Authority for International Application No. PCT/JP2020/023078, dated Jan. 6, 2022.
(Continued)

*Primary Examiner* — Magda Cruz
(74) *Attorney, Agent, or Firm* — Birch, Stewart, Kolasch & Birch, LLP

(57) ABSTRACT

A projection device includes: a housing that includes a base portion and a protruding portion protruding from the base portion; a projection lens that projects image light onto a projection target, is disposed to face the protruding portion, and is mounted on the base portion; a prism that is disposed in the base portion to face an incident-side end part of the projection lens; a plurality of transmission type electro-optical elements that are arranged to face a plurality of side surfaces of the prism, respectively; and a semiconductor light source that is disposed in the protruding portion and generates the image light.

2 Claims, 21 Drawing Sheets

(51) Int. Cl.
    *G03B 21/16* (2006.01)
    *G03B 21/20* (2006.01)
(52) U.S. Cl.
    CPC ............ *G03B 21/16* (2013.01); *G03B 21/204* (2013.01); *G03B 21/2066* (2013.01); *G03B 21/2073* (2013.01)
(58) Field of Classification Search
    CPC .... G03B 21/2013; G03B 21/16; G03B 21/28; G02F 1/1313; G02F 2203/01; G02B 19/00; H04N 5/74
    See application file for complete search history.

(56) References Cited

U.S. PATENT DOCUMENTS

| | | | | |
|---|---|---|---|---|
| 2011/0019159 | A1* | 1/2011 | Egawa | G03B 21/16 353/57 |
| 2011/0216287 | A1* | 9/2011 | Kitamura | G03B 21/145 353/61 |
| 2011/0310355 | A1* | 12/2011 | Otsuka | G03B 21/16 353/31 |
| 2014/0300871 | A1 | 10/2014 | Yanagisawa et al. | |
| 2018/0217477 | A1* | 8/2018 | Kurota | G03B 21/145 |
| 2020/0033705 | A1 | 1/2020 | Meguro et al. | |
| 2020/0033706 | A1* | 1/2020 | Iinuma | H04N 9/3141 |
| 2020/0292923 | A1* | 9/2020 | Amano | G02B 27/0955 |
| 2021/0149291 | A1 | 5/2021 | Kayano | |
| 2021/0208490 | A1* | 7/2021 | Shimizu | G03B 21/16 |

FOREIGN PATENT DOCUMENTS

| | | |
|---|---|---|
| WO | WO 2018/042849 A1 | 3/2018 |
| WO | WO 2018/055984 A1 | 3/2018 |
| WO | WO 2018/180902 A1 | 10/2018 |
| WO | WO 2019/107413 A1 | 6/2019 |

OTHER PUBLICATIONS

International Search Report for International Application No. PCT/JP2020/023078, dated Sep. 1, 2020, with English translation.
Japanese Office Action for Japanese Application No. 2021-528165, dated Jul. 26, 2022, with English translation.

* cited by examiner

PROJECTION DEVICE

CROSS-REFERENCE TO RELATED APPLICATIONS

This application is a continuation application of International Application No. PCT/JP2020/023078, filed Jun. 11, 2020, the disclosure of which is incorporated herein by reference in its entirety. Further, this application claims priority from Japanese Patent Application No. 2019-121324, filed Jun. 28, 2019, the disclosure of which is incorporated herein by reference in its entirety.

BACKGROUND OF THE INVENTION

1. Field of the Invention

The technique of the present disclosure relates to a projection device.

2. Description of the Related Art

A projector as a projection device for projecting an image onto a screen has been widely distributed. A projector comprises, for example, an image forming panel as an electro-optical element, such as a liquid crystal display (LCD) or a digital micromirror device (DMD: registered trademark), a light source that emits light used to generate image light, and a projection lens that projects the image light formed by the image forming panel onto a screen.

Projectors comprising projection lenses, which can change the projection direction of an image, have been developed as such a projector (see WO2018/055964A, WO2019/107413A, and the like). In these projectors, an image forming panel, a light source, and the like are housed in a housing that is a body part and a projection lens is mounted on the outer peripheral surface of the housing.

In the projectors disclosed in WO2018/055964A and WO2019/107413A, luminous flux representing an image formed by the image forming panel is incident on the projection lens from the body part. The projection lens comprises a bending optical system having three optical axes, that is, a first optical axis, a second optical axis, and a third optical axis in this order from an incident side. The first optical axis is an optical axis corresponding to luminous flux incident from the body part, and the second optical axis is bent at an angle of 90° from the first optical axis. The third optical axis is an emission optical axis which is bent at an angle of 90° from the second optical axis and along which luminous flux is emitted to a screen.

Further, in the projector disclosed in WO2019/107413A, a part of the housing is provided with a storage portion for storing the projection lens and the projection lens is mounted on the housing to be rotationally movable between a first position at which the projection lens is stored in the storage portion and a second position at which the projection lens protrudes from the housing.

On the other hand, JP2014-112258A proposes a projector comprising a liquid cooling device that cools heat sources, such as the electro-optical element and the light source, with cooling liquid, a thermoelectric conversion element that lowers the temperature of the cooling liquid of the liquid cooling device, and an air cooling device that supplies cooling air to the heat sources.

SUMMARY OF THE INVENTION

An object of a technique of the disclosure is to provide a projection device which includes a housing including a protruding portion and a projection lens disposed to face the protruding portion and in which the temperature rise of each of a light source, an electro-optical element, and a prism is likely to be suppressed and an optical path length to the electro-optical element from the light source is likely to be increased.

A projection device according to an aspect of the disclosure comprises: a housing that includes a base portion and a protruding portion protruding from the base portion; a projection lens that projects image light onto a projection target, is disposed to face the protruding portion, and is mounted on the base portion; a prism that is disposed in the base portion to face an incident-side end part of the projection lens; a plurality of transmission type electro-optical elements that are arranged to face a plurality of side surfaces of the prism, respectively; and a semiconductor light source that is disposed in the protruding portion and generates the image light.

It is preferable that the semiconductor light source is a semiconductor laser.

It is preferable that the projection device further comprises a wavelength conversion element provided in the base portion and converting a wavelength of laser light emitted from the semiconductor light source.

It is preferable that the wavelength conversion element is disposed to be close to a side surface, which is closer to the protruding portion, of two side surfaces of the base portion facing each other.

It is preferable that a control board is disposed in the base portion and the control board is disposed to be close to a side surface, which is farther from the protruding portion, of two side surfaces of the base portion facing each other.

It is preferable that each of the plurality of transmission type electro-optical elements is a liquid crystal display device.

It is preferable that two electro-optical elements among the plurality of electro-optical elements are arranged to face each other with the prism interposed therebetween.

It is preferable that the projection device further comprises a first intake fan taking gas into the protruding portion from a first intake port formed on one surface of the protruding portion and a guide mechanism guiding the gas, which is taken into the protruding portion by the first intake fan, into the base portion.

It is preferable that the first intake port is formed on a first side surface of the protruding portion facing the projection lens.

It is preferable that the housing includes a second side surface and a third side surface provided on the base portion, the second side surface has a same orientation as the first side surface, and the third side surface has an orientation opposite to an orientation of the first side surface, and the projection device further comprises a plurality of exhaust fans discharging gas from a first exhaust port and a second exhaust port formed on the second side surface and the third side surface, respectively.

It is preferable that the projection device further comprises a plurality of exhaust fans and, among the plurality of exhaust fans, a number of rotations of at least one of the exhaust fans, which are far from the first intake fan, per unit time is larger than the number of rotations of at least one of the exhaust fans, which are close to the first intake fan, per unit time.

It is preferable that an amount of gas to be taken in from the first intake fan is larger than an average of amount of gas to be discharged from the plurality of exhaust fans.

It is preferable that the housing includes a second side surface or a third side surface provided on the base portion, the second side surface has a same orientation as the first side surface, and the third side surface has an orientation opposite to an orientation of the first side surface, the projection lens includes a mechanism for changing a projection direction of the image light, and the projection device further comprise a variable mechanism changing an exhaust direction of gas discharged from an exhaust port formed on the second side surface or the third side surface in conjunction with the projection direction.

It is preferable that the projection device further comprises a second intake fan taking gas into the protruding portion from a second intake port formed on a fourth side surface intersecting the first side surface of the protruding portion.

DESCRIPTION OF THE PREFERRED EMBODIMENTS

An example of an embodiment of a technique of the disclosure will be described below with reference to the drawings.

Terms, such as "first", "second", and "third", used in this specification are added to avoid the confusion of components and do not limit the number of components present in a projector or a lens.

Figure 1:
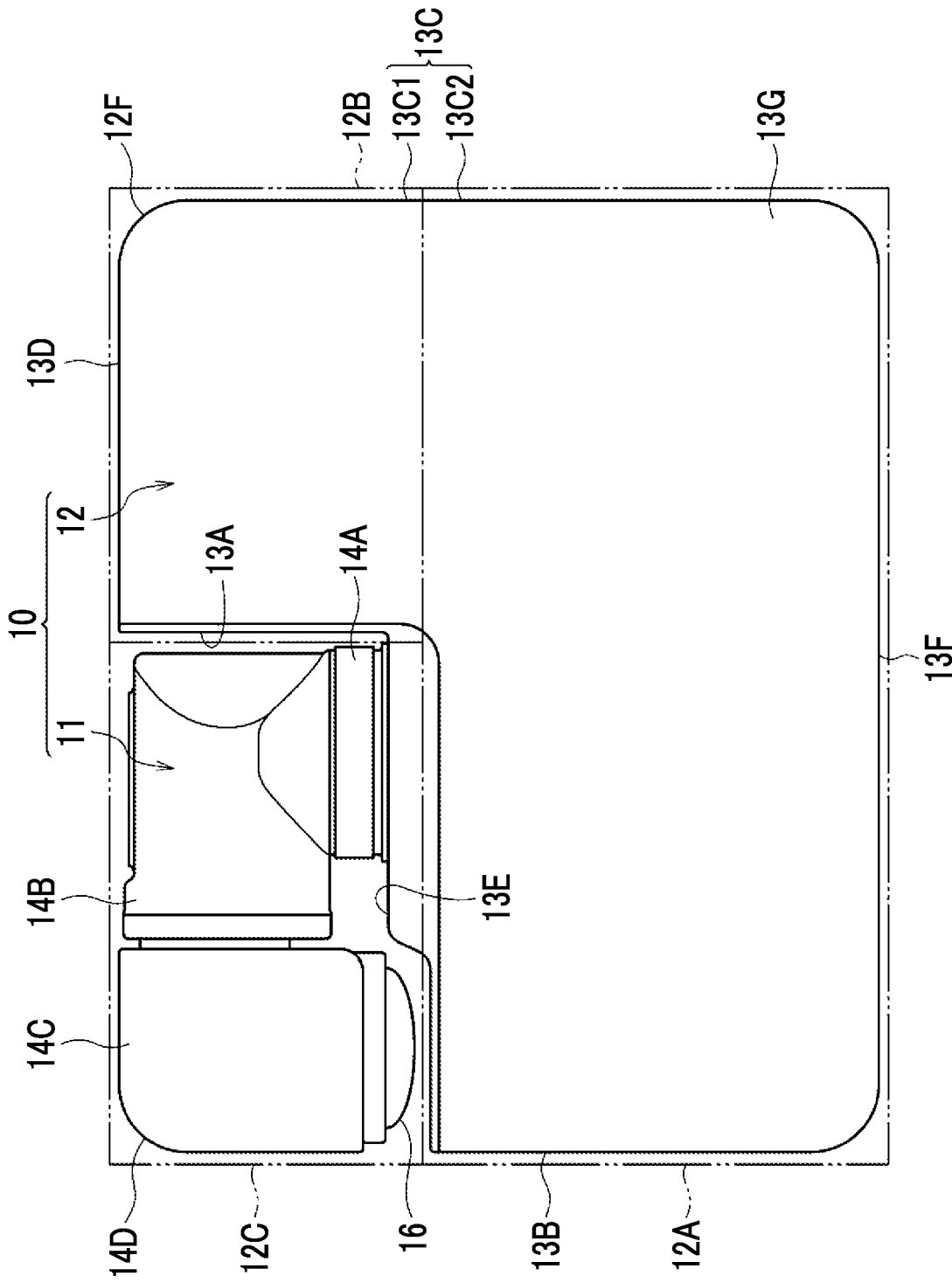
FIG. 1 is a plan view of a projector according to an embodiment.

As shown in FIG. 1, a projector 10 according to an embodiment corresponds to a projection device and comprises a projection lens 11 and a body part 12. The body part 12 corresponds to a housing. One end portion of the projection lens 11 is mounted on the body part 12. FIG. 1 shows a storage state where the projection lens 11 is stored in a case where the projector 10 is not in use.

The body part 12 comprises a base portion 12A and a protruding portion 12B. The body part 12 houses main components, such as an image forming unit 20 (see FIG. 5) and a control board 22 (see FIG. 5).

The base portion 12A has a substantially rectangular shape that is horizontally long in a plan view shown in FIG. 1. The protruding portion 12B protrudes from one side (end portion) of the base portion 12A. The protruding portion 12B has a substantially rectangular shape, and the width of the protruding portion 12B is about a half of the length of one side of the base portion 12A. For this reason, the body part 12 has a substantially L-shape in a plan view as a whole including the base portion 12A and the protruding portion 12B. The shape of the body part including the protruding portion 12B may not be a substantially L-shape.

Figure 2:
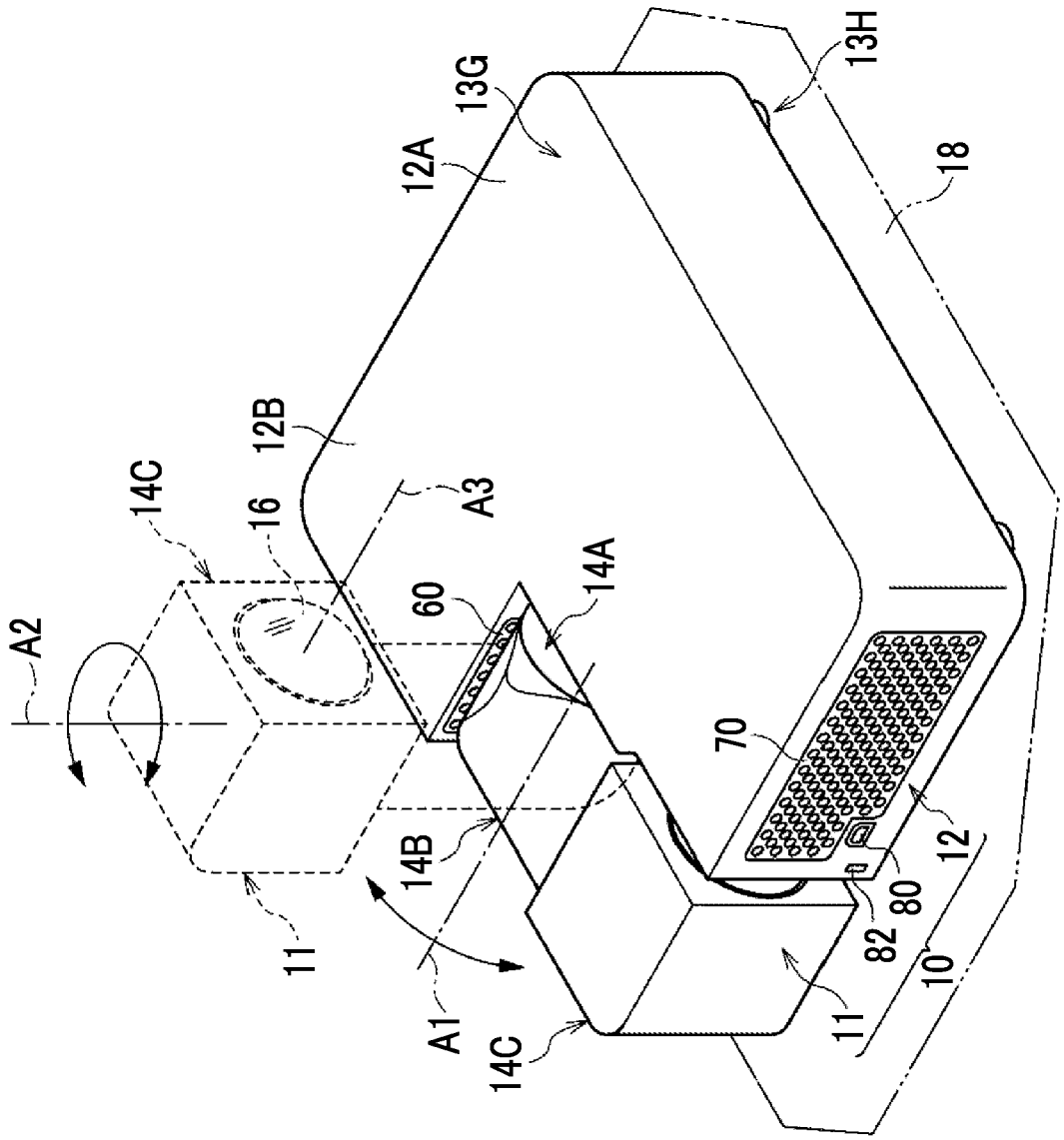
FIG. 2 is a perspective view of the horizontally placed projector.

The body part 12 includes a pair of main surfaces 13G and 13H having a substantially L-shape (see FIG. 2). The pair of main surfaces 13G and 13H corresponds to a top surface and a bottom surface in a case where the body part 12 is horizontally placed as shown in FIG. 2. A part of each of the main surfaces 13G and 13H forms the outer peripheral surface of the body part 12A, and the rest thereof forms the outer peripheral surface of the protruding portion 12B.

Further, returning to FIG. 1, the body part 12 includes six side surfaces, that is, a first side surface 13A, a second side surface 13B, a third side surface 13C, a fourth side surface 13D, a fifth side surface 13E, and a sixth side surface 13F as side surfaces corresponding to the respective sides of the pair of main surfaces 13G and 13H having a substantially L-shape.

Three surfaces of the first side surface 13A, the second side surface 13B, and the third side surface 13C are substantially parallel to each other. The first side surface 13A and the second side surface 13B have the same orientation. The first side surface 13A forms one outer peripheral surface of the protruding portion 12B, and the second side surface 13B forms one outer peripheral surface of the base portion 12A. The third side surface 13C has an orientation opposite to the orientation of each of the first side surface 13A and the second side surface 13B. A portion 13C1, which is a part of the third side surface 13C, forms one outer peripheral surface of the protruding portion 12B and a portion 13C2, which is the rest thereof, forms one outer peripheral surface of the base portion 12A. For example, the portion 13C1 and the portion 13C2 of the third side surface 13C are continuous with each other. The portion 13C1 and the portion 13C2 may not be continuous with each other, or a groove or a step may be formed between the portion 13C1 and the portion 13C2.

Three side surfaces, that is, the fourth side surface 13D, the fifth side surface 13E, and the sixth side surface 13F are orthogonal to three side surfaces, that is, the first side surface 13A, the second side surface 13B, and the third side surface 13C. That is, in FIG. 1, the three side surfaces, that is, the first side surface 13A, the second side surface 13B, and the third side surface 13C are surfaces extending in a vertical direction, and the three side surfaces, that is, the fourth side surface 13D, the fifth side surface 13E, and the sixth side surface 13F are surfaces extending in a horizontal direction.

The fourth side surface 13D and the fifth side surface 13E have the same orientation. The fourth side surface 13D forms one outer peripheral surface of the protruding portion 12B, and the fifth side surface 13E forms one outer peripheral surface of the base portion 12A. The sixth side surface 13F has an orientation opposite to the orientation of each of the fourth side surface 13D and the fifth side surface 13E. The sixth side surface 13F forms one outer peripheral surface of the base portion 12A.

In other words, the body part 12, which is an example of the housing, comprises the second side surface 13B that has the same orientation as the first side surface 13A, which is one surface of the protruding portion 12B, on the base portion 12A and comprises the third side surface 13C that has an orientation opposite to the orientation of the first side surface 13A.

Further, the respective meanings of "the same orientation" and "opposite orientations" in this specification are as follows in terms of the respective surfaces forming the outer periphery of the housing that shows the body part 12 as an example. A fact that the respective surfaces have "the same orientation" means that an angle between outward normal vectors of the respective surfaces facing the outside of the housing is 30° or less. Furthermore, in this specification, a fact that the respective surfaces have "opposite orientations" means that an angle between outward normal vectors of the respective surfaces facing the outside of the housing is 150° or more. In the above-mentioned example, in a case where the first side surface 13A, the second side surface 13B, and the third side surface 13C are parallel to each other, an angle between the normal vectors of the first side surface 13A and the second side surface 13B is 0° and an angle between the normal vectors of the first side surface 13A and the third side surface 13C is 180°. That is, the first side surface 13A, the second side surface 13B, and the third side surface 13C do not necessarily need to be parallel to each other, and an angle between the outward normal vectors of the respective surfaces has only to be in a range satisfying the above-mentioned range.

In FIG. 1, a space formed on the left side of the protruding portion 12B is a space in which the projection lens 11 is to be disposed. Since this space is a space in which the appearance of the projection lens 11 being not in use is to be housed, this space will be referred to as a storage portion 12C storing the projection lens 11 for convenience in this specification. The storage portion 12C has a substantially rectangular shape in a plan view like the protruding portion 12B. That is, it is assumed that the fourth side surface 13D, which is an upper side surface, and the second side surface 13B, which is a left side surface, in FIG. 1 among the outer peripheral surfaces of the body part 12 extend in directions where the fourth side surface 13D and the second side surface 13B intersect each other. A space, which is defined using the respective extending side surfaces 13D and 13B as outer edges, is the storage portion 12C. For this reason, the body part 12 has a substantially L-shape by itself, but has a substantially rectangular shape in a plan view as a whole including the storage portion 12C.

In a case where the projector 10 is not in use, the projection lens 11 is stored in the storage portion 12C after being transformed not to protrude from the rectangular storage portion 12C.

Figure 4:
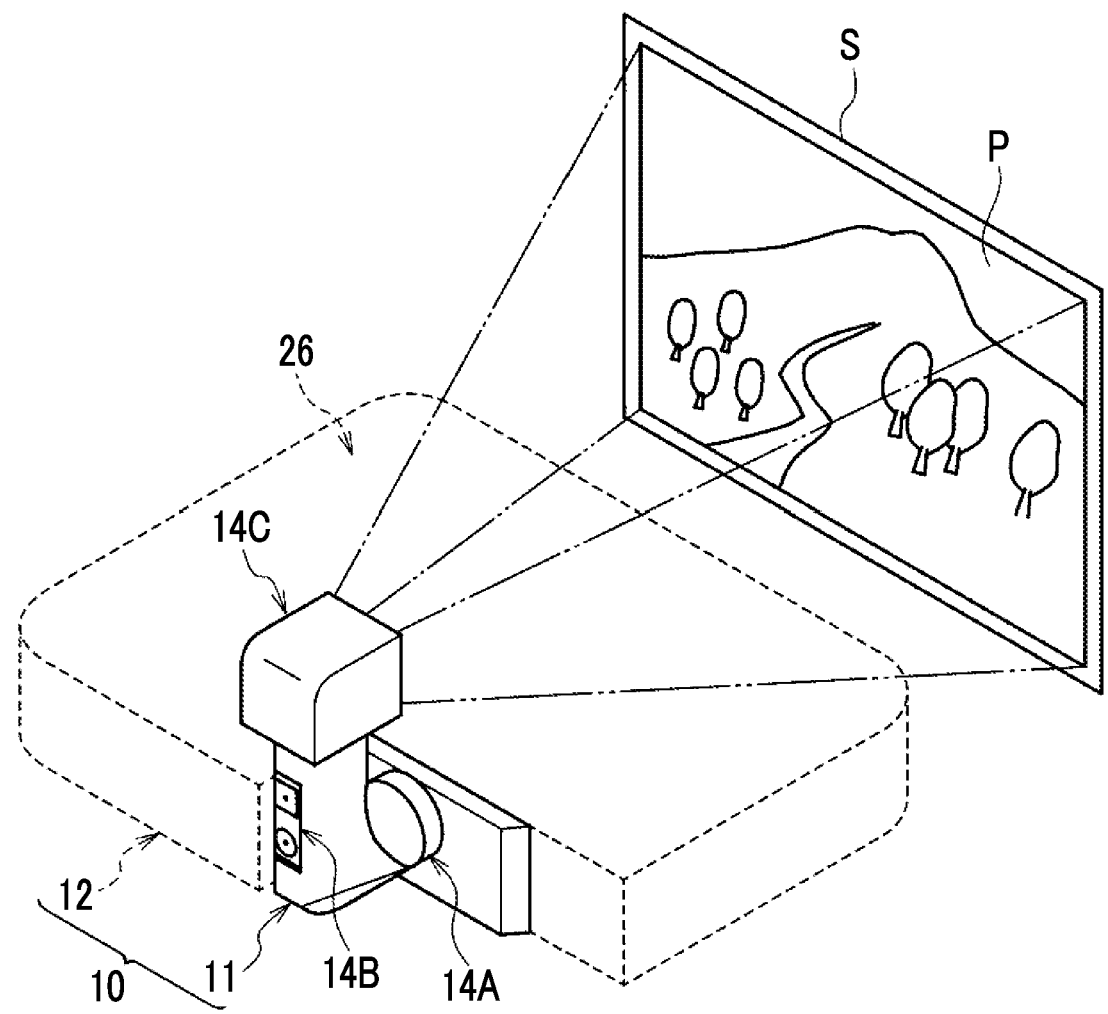
FIG. 4 is a diagram showing an aspect where the projector is used to project an image onto a screen.

Luminous flux representing an image formed by the image forming unit 20 is incident on the projection lens 11 from the body part 12. The projection lens 11 enlarges image light, which is based on the incident luminous flux, by an optical system and forms an image. Accordingly, the projection lens 11 projects the enlarged image of the image, which is formed by the image forming unit 20, onto a screen S (see FIG. 4) that is a projection target.

Since the projection lens 11 includes a bending optical system (see FIGS. 2 and 3) for bending an optical axis twice by way of example, the projection lens 11 has a substantially U-shape convex upward as a whole in the storage state shown in FIG. 1. The projection lens 11 comprises an incident-side end part 14A, an intermediate part 14B, and an emission-side end part 14C. The incident-side end part 14A is connected to one end of both ends of the intermediate part 14B, and the emission-side end part 14C is connected to the other end of both ends of the intermediate part 14B. Light emitted from the body part 12 is incident on the incident-side end part 14A. The emission-side end part 14C is provided with an emission lens 16. Light, which is incident on the incident-side end part 14A from the body part 12, is guided to the emission-side end part 14C through the intermediate part 14B. The emission-side end part 14C emits light, which is guided from the body part 12 through the incident-side end part 14A and the intermediate part 14B, to the screen S from the emission lens 16.

The projection lens 11 is disposed on one side of the base portion 12A to face the protruding portion 12B, and the incident-side end part 14A is mounted on the outer peripheral surface of the base portion 12A. The mounting position of the incident-side end part 14A is a position adjacent to the protruding portion 12B in a horizontal direction in FIG. 1, and is positioned near the middle of the base portion 12A. In the storage state of the projection lens 11, the intermediate part 14B extends from near the middle of the base portion 12A toward an end portion thereof opposite to the protruding portion 12B, that is, the left side in FIG. 1.

Figure 3:
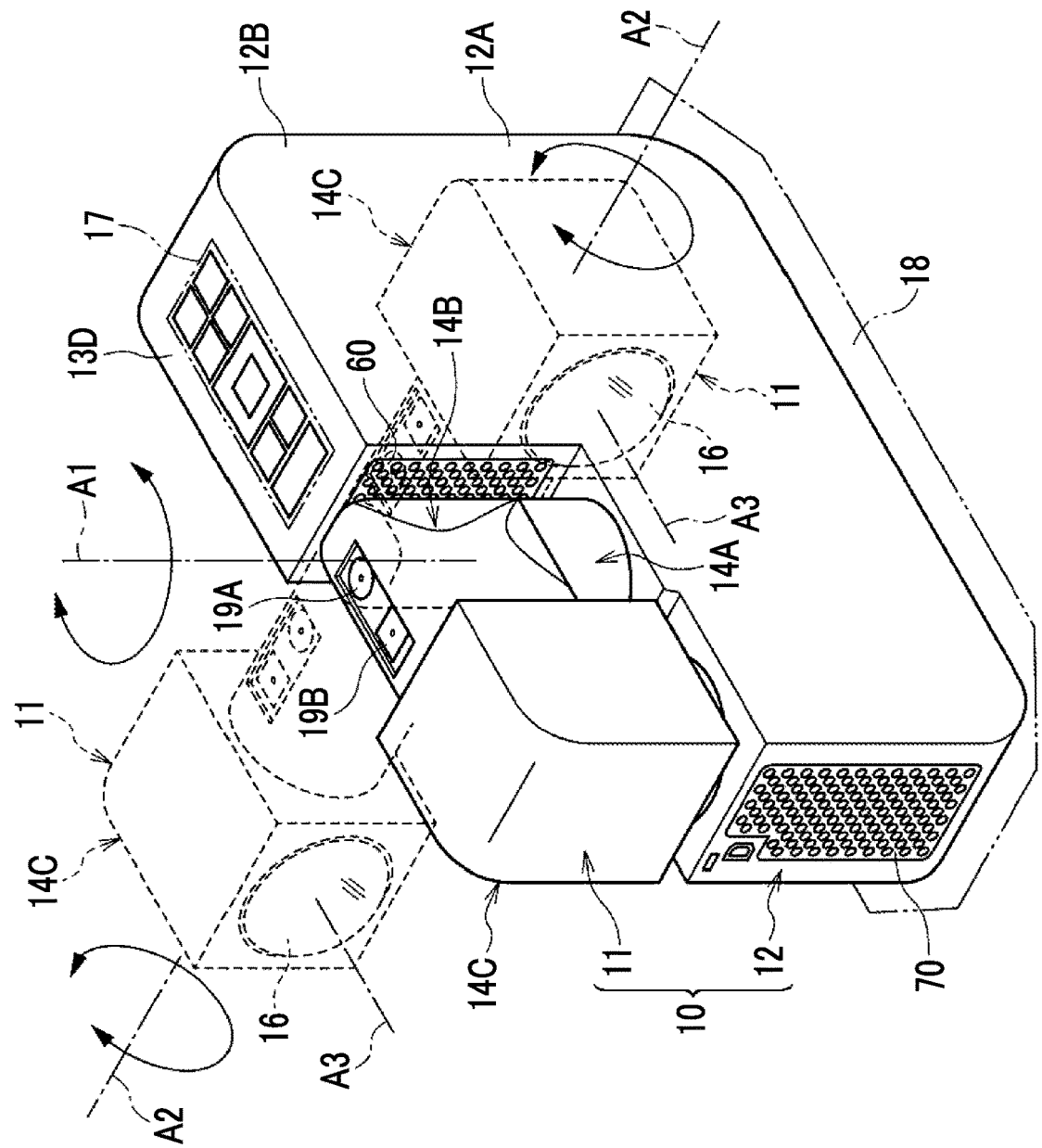
FIG. 3 is a perspective view of the vertically placed projector.

As shown in FIGS. 2 and 3, the projection lens 11 comprises the bending optical system. The bending optical system has a first optical axis A1, a second optical axis A2, and a third optical axis A3. The second optical axis A2 is an optical axis that is bent at an angle of 90° from the first optical axis A1. The third optical axis A3 is an optical axis that is bent at an angle of 90° from the second optical axis A2.

The incident-side end part 14A is non-rotatably mounted on the body part 12. The intermediate part 14B is rotatable about the first optical axis A1 with respect to the incident-side end part 14A. Since the emission-side end part 14C is connected to the intermediate part 14B, the emission-side end part 14C is also rotated about the first optical axis A1 in a case where the intermediate part 14B is rotated with respect to the incident-side end part 14A. A rotatable range about the first optical axis A1 is 180° in this example. The incident-side end part 14A may be rotatable with respect to the body part 12 instead of the intermediate part 14B.

Further, the emission-side end part 14C is rotatable about the second optical axis A2 with respect to the intermediate part 14B. The rotation of the emission-side end part 14C about the second optical axis A2 is not limited and, for example, the emission-side end part 14C can also be rotated at an angle of 360° or more.

As described above, the emission-side end part 14C is rotatable about two axes, which are the first optical axis A1 and the second optical axis A2, as rotation axes. The projection lens 11 is provided with a rotational position detection sensor (not shown) that detects a rotational position about the first optical axis A1 and a rotational position about the second optical axis A2.

FIG. 2 shows a state where the projector 10 is horizontally placed on an installation surface 18, and FIG. 3 shows a state where the projector 10 is vertically placed on the installation surface 18. As described above, the projector 10 can be used in a horizontal attitude and a vertical attitude.

As shown in FIG. 3, the fourth side surface 13D of the protruding portion 12B is provided with an operation panel 17. The operation panel 17 includes a plurality of operation switches. The operation switches are, for example, a power switch, adjustment switches, and the like. The adjustment switches are switches that are used to perform various adjustments. The adjustment switches include, for example, switches that are used to perform the image quality adjustment and keystone correction of an image projected onto the screen S.

One surface of the intermediate part 14B of the projection lens 11 is provided with a first unlock switch 19A and a second unlock switch 19B. The projection lens 11 is provided with a first rotation locking mechanism and a second rotation locking mechanism. The first rotation locking mechanism locks the rotation of the intermediate part 14B about the first optical axis A1 with respect to the incident-side end part 14A. The second rotation locking mechanism locks the rotation of the emission-side end part 14C about the second optical axis A2 with respect to the intermediate part 14B. The first unlock switch 19A is an operation switch that inputs an instruction to unlock the rotation of the intermediate part 14B to the first rotation locking mechanism. The second unlock switch 19B is an operation switch that inputs an instruction to unlock the rotation of the emission-side end part 14C to the second rotation locking mechanism.

Further, as shown in FIGS. 2 and 3, a power cable port 80 for a power cable and a video cable port 82 for a video cable are formed on the second side surface 13B of the base portion 12A. The video cable connects the projector 10 to an external device, such as a personal computer outputting video signals. For example, a high-definition multimedia interface (HDMI: registered trademark) cable, a Digital Visual Interface (DVI) cable, and a Video Graphics Array (VGA) cable can be used as the type of the video cable.

Figure 5:
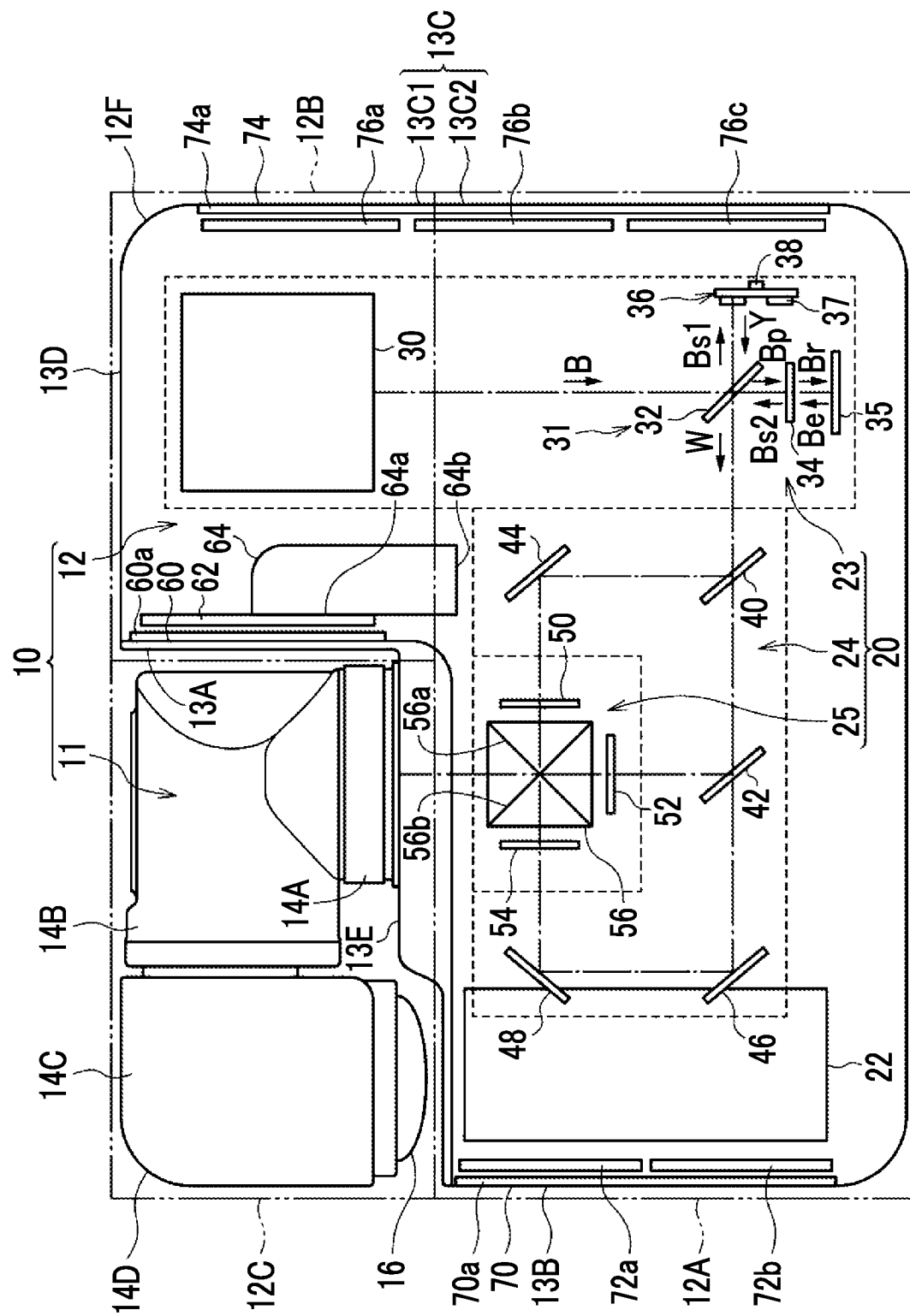
FIG. 5 is a plan view showing the schematic configuration of the inside of a body of the projector.

The image forming unit 20 forms an image to be projected. As shown in FIG. 5, the image forming unit 20 includes a light source section 23, a color separation section 24, and an image light generation section 25.

The light source section 23 is, for example, a white light source and supplies white light to the color separation section 24. The color separation section 24 separates the white light, which is emitted from the light source section 23, into three types of color lights corresponding to a red color, a green color, and a blue color. The color lights, which are separated by the color separation section 24 to correspond to a red color, a green color, and a blue color, are modulated to image lights, which have image information and correspond to the respective colors, that is, a red color, a green color, and a blue color, in the image light generation section 25. Then, the respective modulated color image lights are combined in the image light generation section 25, so that image light having image information corresponding to three colors, that is, a red color, a green color, and a blue color is generated. This image light is incident on the projection lens 11.

In this example, the light source section 23 includes a light emitting module 30, which includes semiconductor light-emitting elements, and a light combination section 31. The light emitting module 30 is a light source comprising semiconductor lasers, which emit blue light B as, for example, laser light, as the semiconductor light-emitting elements. The semiconductor laser is an example of a semiconductor light source according to the technique of the disclosure. The light combination section 31 comprises a polarization separation element 32, a quarter-wave plate 34, a mirror 35, and a phosphor wheel 36. The phosphor wheel 36 includes, for example, a phosphor that is excited by blue light B and emits yellow light Y. That is, the phosphor wheel 36 functions as a wavelength conversion element that converts blue light B into yellow light Y having a wavelength longer than the wavelength of blue light B. In this example, the light combination section 31 converts a part of blue light B into yellow light Y and combines blue light B with yellow light Y to generate white light W.

Blue light B emitted from the light emitting module 30 is incident on the polarization separation element 32 of the light combination section 31. The polarization separation element 32 is disposed to form an angle of 45° with respect to the optical axis. The polarization separation element 32 has a polarization separation function that separates incident blue light B into S-polarized light components and P-polarized light components with respect to the polarization separation element 32. The polarization separation element 32 reflects S-polarized light components and transmits P-polarized light components. Further, in this embodiment, the polarization separation element 32 has wavelength selectivity and transmits light, which has a wavelength range different from the wavelength range of blue light, regardless of the polarization state of the light.

P-polarized blue light $B_P$ transmitted through the polarization separation element 32 is converted into circularly polarized light, for example, right-handed circularly polarized blue light Br by being transmitted through the quarter-wave plate 34, and is then incident on the mirror 35. In this case, the mirror 35 reflects the right-handed circularly polarized blue light Br as left-handed circularly polarized blue light Bℓ. The left-handed circularly polarized blue light Bℓ reflected by the mirror 35 is converted into S-polarized blue light Bs2 by being transmitted through the quarter-wave plate 34 again. The S-polarized blue light Bs2 is reflected by the polarization separation element 32 and travels toward the color separation section 24.

On the other hand, S-polarized blue light Bs1 reflected by the polarization separation element 32 is incident on the phosphor wheel 36. The phosphor wheel 36 includes a phosphor layer 37 that is formed on a disc in a ring shape and a motor 38 that rotates the disc. The phosphor wheel 36 is rotated so that incident positions where the blue light Bs1 is to be incident are not concentrated on one place. Since heat is generated at the incident positions of the blue light Bs1, heat-generating portions are dispersed in a case where the phosphor wheel 36 is rotated.

The phosphor layer 37 contains phosphor particles that absorb the blue light Bs1 as excitation light, convert the blue light Bs1 into yellow fluorescence (hereinafter, referred to as yellow light) Y, and emit the yellow fluorescence. For example, an yttrium aluminum garnet (YAG)-based phosphor can be used as the phosphor particles. A material used to make the phosphor particles may be one type of material, or a material into which particles made of two or more types of materials are mixed may be used as phosphor particles.

Since the surface of the disc is a reflective surface, the yellow light Y generated by the phosphor layer 37 is reflected toward the polarization separation element 32. The yellow light Y is transmitted through the polarization separation element 32 and travels toward the color separation section 24. The yellow light Y transmitted through the polarization separation element 32 is combined with the blue light Bs2 reflected by the polarization separation element 32, so that white light W is generated.

The light emitting module 30 may be adapted to include a light emitting element array in which a plurality of semiconductor lasers are arranged two-dimensionally. For example, a light source device disclosed in JP2018-21990A can be used as the light source section 23.

The white light W generated by the light source section 23 as described above is supplied to the color separation section 24 as irradiation light. The color separation section 24 comprises two dichroic mirrors 40 and 42 and three mirrors 44, 46, and 48. The color separation section 24 separates the irradiation light, which is emitted from the light source section 23, into color lights corresponding to three colors, that is, a red color, a green color, and a blue color by the two dichroic mirrors 40 and 42. Further, the color separation section 24 also functions as a light guide member that guides each color light to the image light generation section 25.

The dichroic mirror 40 is disposed on the optical path of the irradiation light that is supplied from the light source section 23. Further, the dichroic mirror 40 is formed in a substantially plate shape and is disposed in an attitude in which the dichroic mirror 40 is tilted at an angle of about 45° with respect to the optical axis of the irradiation light. Since the dichroic mirror 40 has properties in which red light is reflected and green light and blue light are transmitted, the dichroic mirror 40 reflects only red light components of the irradiation light, which is white light, and transmits green light components and blue light components.

The red light reflected by the dichroic mirror 40 is reflected by the mirror 44 and travels toward the image light generation section 25. On the other hand, the green light and the blue light transmitted through the dichroic mirror 40 travel toward the dichroic mirror 42.

Like the dichroic mirror 40, the dichroic mirror 42 is formed in a substantially plate shape and is disposed in an attitude in which the dichroic mirror 42 is tilted at an angle of about 45° with respect to the optical axis of the irradiation light. Since the dichroic mirror 42 has properties in which green light is reflected and blue light is transmitted, the dichroic mirror 42 reflects the green light components of the irradiation light including the green light components and the blue light components transmitted through the dichroic mirror 40 and transmits the blue light components thereof.

The green light reflected by the dichroic mirror 42 travels toward the image light generation section 25. On the other hand, the blue light transmitted through the dichroic mirror 42 travels toward the mirror 46. Like the dichroic mirrors 40 and 42, the mirror 46 is formed in a substantially plate shape and is provided to be tilted at an angle of about 45° with respect to the optical axis of the irradiation light. The blue light reflected by the mirror 46 travels toward the mirror 48. The mirror 48 is provided to be tilted at an angle of about 45° with respect to the optical axis of the blue light that is reflected by the mirror 46. The blue light is reflected by the mirror 48 and travels toward the image light generation section 25.

The image light generation section 25 includes an LCD 50 for red light, an LCD 52 for green light, an LCD 54 for blue light, and a cross dichroic prism 56. The three LCDs 50, 52, and 54 are arranged to face three side surfaces of the cross dichroic prism 56, respectively. In this example, among the three LCDs 50, 52, and 54, the LCD 50 for red light and the LCD 54 for blue light face two side surfaces of the cross dichroic prism 56 facing each other. That is, the LCD 50 for red light and the LCD 54 for blue light are arranged to face each other with the cross dichroic prism 56 interposed therebetween. Further, the LCD 52 for green light is orthogonal to the two side surfaces of the cross dichroic prism 56 that face the two LCDs 50 and 54, and is disposed to face one side surface of which both sides are in contact with the respective two side surfaces.

Among the color lights corresponding to three colors that are separated in the color separation section 24, the red light travels toward the LCD 50 for red light, the green light travels toward the LCD 52 for green light, and the blue light travels toward the LCD 54 for blue light.

Each of the LCD 50 for red light, the LCD 52 for green light, and the LCD 54 for blue light is, for example, a transmission type LCD, and is an example of an image forming panel.

The LCD 50 for red light modulates red light to be transmitted to generate red image light having image information of a red component. The red image light generated by the LCD 50 for red light is incident on the cross dichroic prism 56.

The LCD 52 for green light modulates green light to be transmitted to generate green image light having image information of a green component. The green image light generated by the LCD 52 for green light is incident on the cross dichroic prism 56. Likewise, the LCD 54 for blue light modulates blue light to be transmitted to generate blue image light having image information of a blue component. The blue image light generated by the LCD 54 for blue light is incident on the cross dichroic prism 56.

The cross dichroic prism 56 is formed in a substantially cubic shape using a transparent material, such as glass, and includes dichroic surfaces 56a and 56b, which intersect each other, therein. The dichroic surface 56b has properties in which red light is reflected and green light and blue light are transmitted. The dichroic surface 56a has properties in which blue light is reflected and red light and green light are transmitted.

The cross dichroic prism 56 is disposed to face the incident-side end part 14A of the projection lens 11. The red image light incident on the cross dichroic prism 56 is reflected by the dichroic surface 56b and is incident on the projection lens 11. The green image light is transmitted through each of the dichroic surfaces 56a and 56b and is incident on the projection lens 11. Further, the blue image light is reflected by the dichroic surface 56a and is incident on the projection lens 11.

As described above, the cross dichroic prism 56 integrates the respective incident color image lights to generate image light having image information corresponding to three colors, that is, a red color, a green color, and a blue color, and causes the generated image light to be incident on the projection lens 11. The projection lens 11 projects the image light, which has the image information corresponding to three colors, that is, a red color, a green color, and a blue color, onto the screen S. Accordingly, a full color image is displayed on the screen S.

As shown in FIG. 5, the control board 22 is provided in the body part 12 to be close to the second side surface 13B of the base portion 12A. The control board 22 comprises a control circuit. An example of the control circuit (processor) is a central processing unit (CPU). The control circuit includes a controller that controls the operation of the projection device and a drive circuit that drives the three LCDs 50, 52, and 54. Further, the control board 22 is also provided with a power source circuit and the like. The power source circuit includes an alternating current (AC)-direct current (DC) converter that converts an AC voltage supplied from a commercial power source into a DC voltage, a DC-DC converter that adjusts a DC drive voltage to be supplied to each internal part, and the like.

As already described, the second side surface 13B of the base portion 12A is provided with a power cable port 80 (see FIG. 2) that is electrically connected to the power source circuit. A power cable is connected to this power cable port 80. Accordingly, power supplied from the outside is supplied to the control board 22 through the power cable. The control board 22 is disposed to partially overlap with the image forming unit 20 in a plan view in this embodiment, but does not necessarily need to overlap with the image forming unit 20.

The light source section 23 comprises the light emitting module 30. The light emitting module 30 generates heat as the lasers emit light. The phosphor wheel 36 generates heat as laser light emitted from the light emitting module 30 is incident on the phosphor wheel 36. Further, the image light generation section 25 generates heat due to the drive of the LCDs 50, 52, and 54. Since the respective color image lights transmitted through the respective LCDs 50, 52, and 54 are incident on the cross dichroic prism 56 including surfaces facing the three LCDs 50, 52, and 54 for the respective colors lights, the cross dichroic prism 56 generates heat. Furthermore, various optical elements, such as the above-mentioned dichroic mirrors 40 and 42 where high-power laser light is reflected or transmitted, also generate heat. In addition, the power source circuit and the like of the control board 22 also generate heat.

Among these heat sources provided in the body part 12, the light emitting module 30, the image light generation section 25, and the phosphor wheel 36 are main heat sources that have a relatively large amount of heat to be generated. It is preferable that these members serving as heat sources are arranged in the body part 12 at a certain distance therebetween without being close to each other. The reason for this is that the cooling effects of the respective heat sources are improved since an influence of heat between the respective heat sources can be more easily reduced as an interval between the respective heat sources is longer.

First, the light emitting module 30 is disposed in the protruding portion 12B. The protruding portion 12B protrudes from a substantially right half region of the base portion 12A in FIG. 5. The projection lens 11 is disposed to face the protruding portion 12B, and is mounted on the outer peripheral surface of the base portion 12A. In a case where the protruding portion 12B is disposed in a substantially right half region of the base portion 12A as in this example, the projection lens 11 is positioned in a substantially left half region thereof in FIG. 5.

The cross dichroic prism 56 is disposed in the base portion 12A to face the incident-side end part 14A of the projection lens 11. As described above, the LCDs 50, 52, and 54 for the respective color lights, that is, a red color, a green color, and a blue color are arranged to correspond to three side surfaces of the cross dichroic prism 56. Here, the cross dichroic prism 56 corresponds to a "prism" according to the technique of the disclosure.

According to the above-mentioned arrangement, two heat sources, that is, the light emitting module 30 that includes the semiconductor lasers as an example of the semiconductor light source and the image light generation section 25 that includes the cross dichroic prism 56 as an example of a prism and the LCDs 50, 52, and 54 for the respective color lights as an example of electro-optical elements can be spaced from each other in the body part 12 having an L-shape in a plan view. For this reason, the temperature rise of each heat source is likely to be suppressed in the projection device according to this embodiment as compared to, for example, a case where both the light emitting module 30 and the image light generation section 25 are provided in the base portion 12A.

Further, the laser light emitted from the light emitting module 30 needs to be incident on the LCDs 50, 52, and 54 after passing through the light combination section 31 and the color separation section 24, and particularly a distance between each of the LCDs 50 and 52 and the light emitting module 30 is short. Furthermore, the light of the semiconductor light source, which is represented by laser light, is light of which the parallelism is high and the width of an optical path is difficult to be increased. Accordingly, a length sufficient to arrange the plurality of optical elements included in the light combination section 31 and the color separation section 24 is required as an optical path length to each of the LCDs 50 and 52 from the light emitting module 30 including the semiconductor light source. Since the light emitting module 30 including the semiconductor light source is provided in the protruding portion 12B, an optical path length to the image light generation section 25, which is disposed in the base portion 12A, from the light emitting module 30 is likely to be increased. In a case where the image light generation section 25 uses the three LCDs 50, 52, and 54 for the respective color lights as the plurality of electro-optical elements as in this example, the color separation section 24 that separates white light into each color light is often needed. In that case, the plurality of mirrors of the color separation section 24 need to be arranged in the optical path. For this reason, the configuration where the light emitting module 30 and the image light generation section 25 are spaced from each other as described above is particularly effective in a case where a plurality of electro-optical elements for each color are used.

In addition, the configuration where the light emitting module 30 and the image light generation section 25 are spaced from each other as described above is particularly effective in a case where the semiconductor light source is semiconductor lasers as in this example. The reason for this is that laser light emitted from the semiconductor laser has directivity higher than that of the light emitted from a light emitting diode and has a divergence angle smaller than that of the light emitted from a light emitting diode. Further, the reason for this is that it is necessary to increase a divergence angle in order to increase the angle of view of image light to be projected onto the screen, but a longer optical path length needs to be ensured in the case of the semiconductor laser than in the case of the light emitting diode for that purpose.

Further, the phosphor wheel 36, which is an example of a wavelength conversion element, is provided in the base portion 12A. Since the light emitting module 30 is provided in the protruding portion 12B and the phosphor wheel 36 is disposed in the base portion 12A, both the light emitting module 30 and the phosphor wheel 36 can be spaced from each other. Not only the light emitting module 30 but also the phosphor wheel 36 is a main heat source. For this reason, since heat sources are arranged to be dispersed as compared to, for example, a case where both the light emitting module 30 and the phosphor wheel 36 are provided in the base portion 12A, the temperature rise of each heat source is likely to be suppressed.

In this example, the phosphor wheel 36 is disposed to be close to the third side surface 13C, which is closer to the protruding portion 12B, of two side surfaces of the base portion 12A facing each other, that is, the second side surface 13B and the third side surface 13C. Further, the image light generation section 25 is disposed near the middle of the base portion 12A in this example. For this reason, since the phosphor wheel 36 is disposed in the base portion 12A to be close to the side surface closer to the protruding portion 12B, the phosphor wheel 36 and the image light generation section 25 can also be spaced from each other.

Furthermore, the power source circuit and the like of the control board 22 generate heat as described above. In this example, the control board 22 is disposed to be close to the second side surface 13B, which is farther from the protruding portion 12B, of two side surfaces of the base portion 12A facing each other, that is, the second side surface 13B and the third side surface 13C. Accordingly, the control board 22 and the light emitting module 30 can be spaced from each other.

Here, the side surface, which is closer to the protruding portion 12B, of two side surfaces facing each other, that is, the second side surface 13B and the third side surface 13C means a side surface positioned on a side (a right side shown in FIG. 5), on which the protruding portion 12B is provided, of the center of the base portion 12A in a width direction (a horizontal direction shown in FIG. 5) in a plan view. Likewise, the side surface, which is farther from the protruding portion 12B, means a side surface positioned on a side (a left side shown in FIG. 5), on which the protruding portion 12B is not provided, of the center of the base portion 12A in the width direction (the horizontal direction shown in FIG. 5) in a plan view shown in FIG. 5.

Since the light emitting module 30, the image light generation section 25, and the phosphor wheel 36, which are main heat sources, are arranged in the body part 12 having an L-shape in a plan view to be dispersed as described above, the plurality of main heat sources can be spaced from each other. Accordingly, the temperature rise of each heat source is likely to be suppressed in the projector 10 according to this embodiment as compared to, for example, a case where all the plurality of main heat sources are arranged in the base portion 12A to be close to each other.

In addition, the projector 10 comprises an intake/exhaust mechanism to cool the plurality of heat sources provided in the body part 12A in addition to devise the arrangement of the plurality of the main heat sources.

Figure 6:
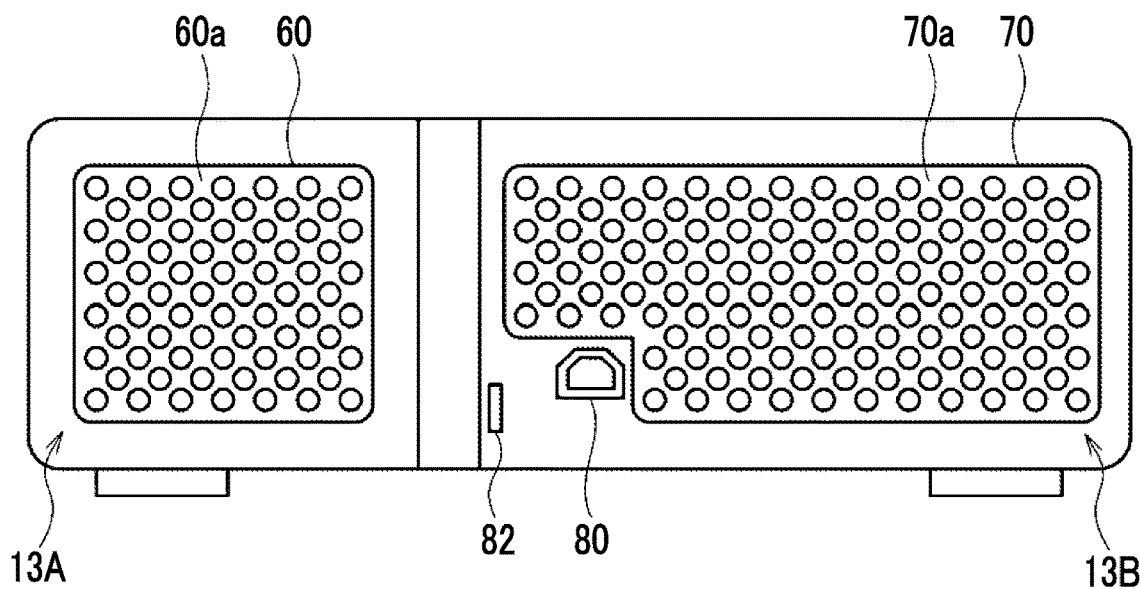
FIG. 6 is a side view showing a third side surface of the projector.
Figure 7:
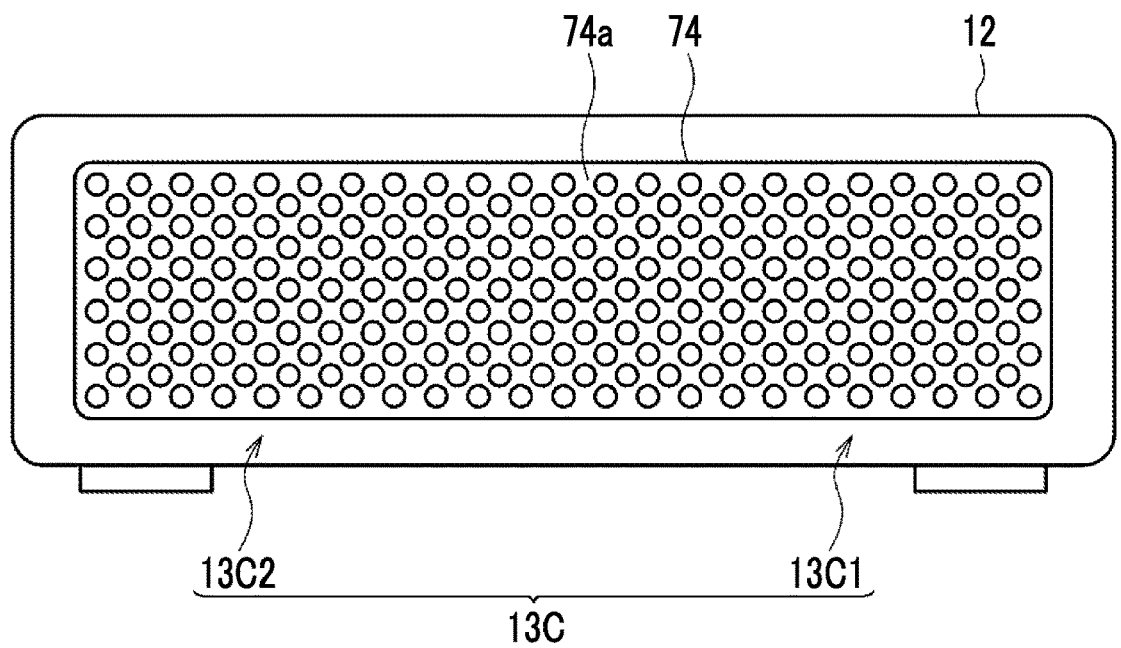
FIG. 7 is a side view showing first and second side surfaces of the projector.

The intake/exhaust mechanism will be described below. FIG. 6 is a view of the body part seen from the left side in FIG. 5, and FIG. 7 is a view of the body part seen from the right side in FIG. 5. However, FIG. 6 shows a state where the projection lens 11 is removed from the body part 12.

As shown in FIGS. 5 to 7, the projector 10 comprises a first intake port 60 provided on the first side surface 13A of the protruding portion 12B. As described above, the first side surface 13A of the protruding portion 12B is a surface facing the projection lens 11. Further, the projector 10 comprises a first intake fan 62 that is provided in the protruding portion 12B to face the first intake port 60 and takes in air as gas into the protruding portion 12B from the first intake port 60. Furthermore, the projector 10 comprises a duct 64 as a guide mechanism that guides air taken in by the first intake fan 62 into the base portion 12A.

The duct 64 is disposed to guide at least a part of air, which is taken in by the first intake fan 62, to the base portion 12A. In this embodiment, the duct 64 is disposed as shown in FIG. 8 so that one opening 64a of the duct 64 covers about a half of the surface of the intake fan 62 and the other opening 64b faces the base portion 12A.

Figure 8:
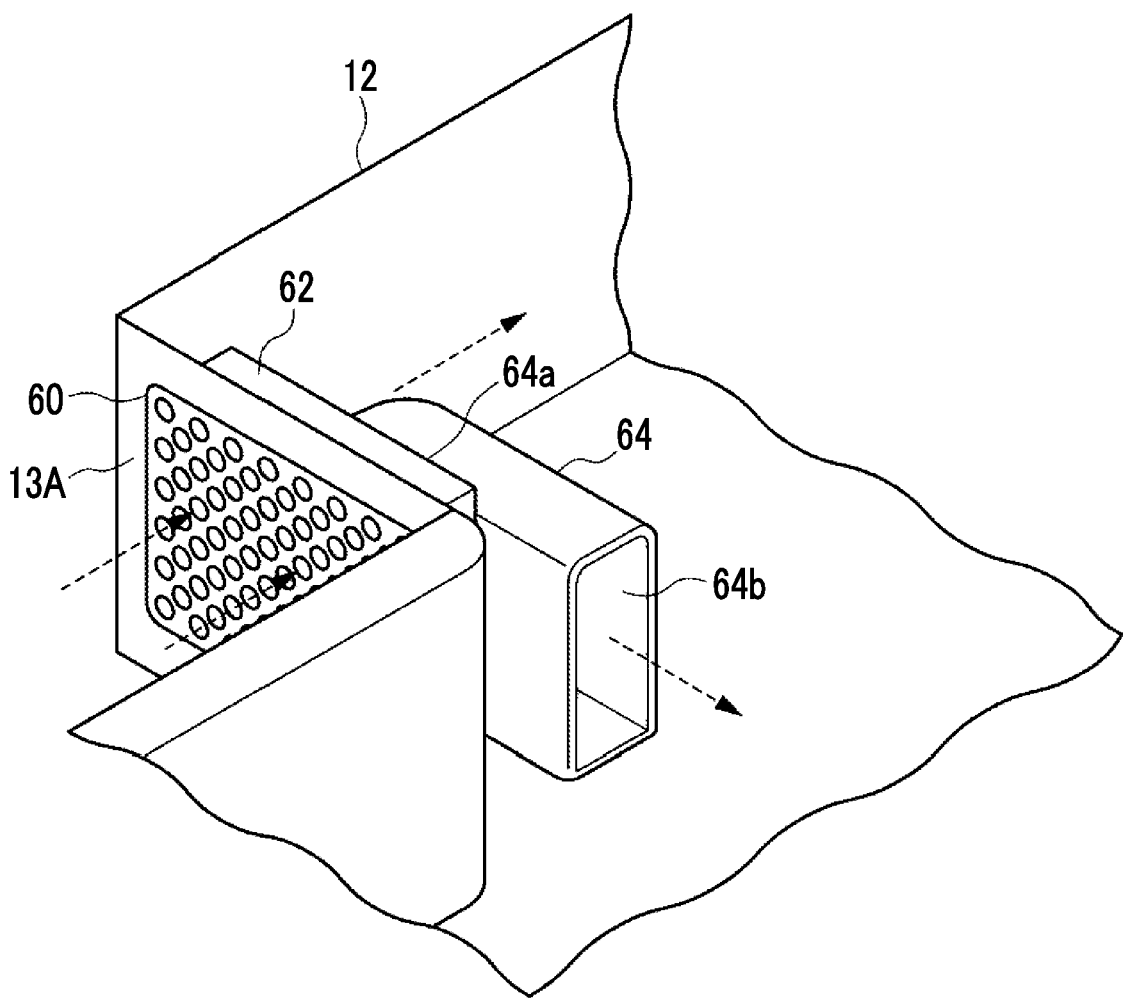
FIG. 8 is a perspective view showing the configuration of a first intake port formed on the first side surface and a duct.

As shown by broken-line arrows in FIG. 8, air is taken in from the first intake port 60 by the intake fan and is supplied into the protruding portion 12B. In this case, a part of the air is supplied into the duct 64 from one opening 64a of the duct 64 and is discharged from the other opening 64b through the duct 64. In this case, since the opening 64b faces the base portion 12A, air passing through the duct 64 is discharged to the base portion 12A. On the other hand, the other part of the air taken in from the first intake port 60 flows into the protruding portion 12B as it is without being supplied to the duct 64. The reason why the opening 64a of the duct 64 is disposed to cover only about a half of the surface of the intake fan 62 is to supply cooling air to the light emitting module 30 positioned in the protruding portion 12B. In a case where a heat source, such as the light emitting module 30, is not disposed in the protruding portion 12B, the opening 64a of the duct 64 may be adapted to cover the entire intake fan 62 and to discharge all the taken air to the base portion 12A.

Further, as shown in FIG. 5, the projector 10 comprises a first exhaust port 70 provided on the second side surface 13B of the base portion 12A and comprises a second exhaust port 74 provided on the third side surface 13C. Furthermore, the projector 10 comprises a plurality of exhaust fans 72a, 72b, 76a, 76b, and 76c that discharges air from the first exhaust port 70 and the second exhaust port 74, respectively. Specifically, the projector 10 comprises two first exhaust fans 72a and 72b that are provided in the base portion 12A to face the first exhaust port 70. Further, the projector 10 comprises three second exhaust fans 76a, 76b, and 76c that are provided in the protruding portion 12B and the base portion 12A to face the second exhaust port 74.

In this example, for example, porous members 60a, 70a, and 74a, such as punching metals in which a plurality of small holes are formed, are installed in the intake port 60 and the two exhaust ports 70 and 74, respectively. The shape of the hole formed in the porous member may be any shape, such as an elliptical shape and a polygonal shape, without being limited to a circular shape, and the number of the holes is also not limited. Further, the intake port and the exhaust ports may be formed of a plurality of small holes that are formed on the surfaces themselves of the housing.

Figure 9:
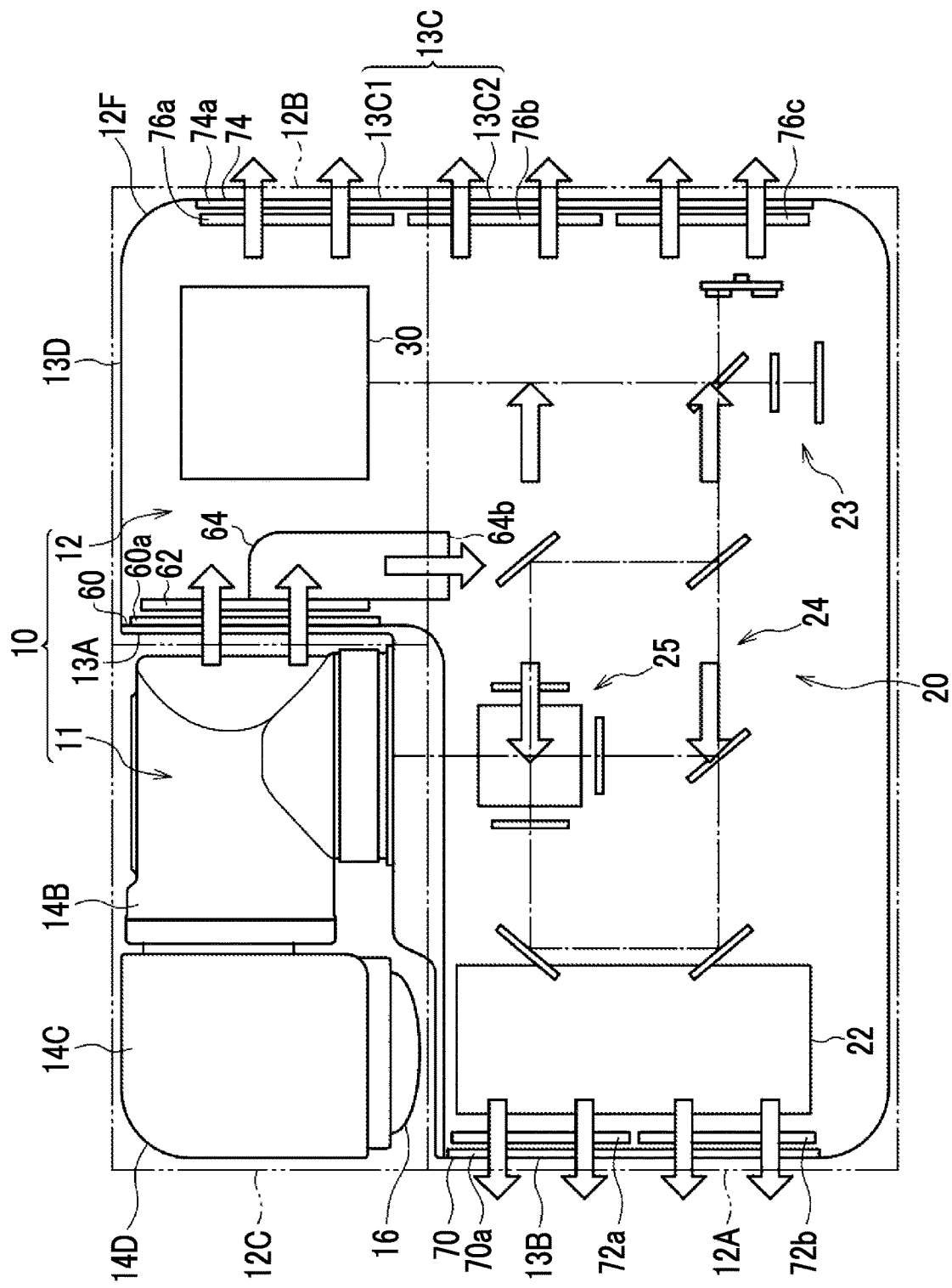
FIG. 9 is a diagram showing the flow of air inside a body part of the projector.

The flow of air in the body part 12 is shown in FIG. 9 by arrows. As already described, the air taken in from the first intake port 60 is taken into the protruding portion, a part of the air is supplied into the base portion 12A through the duct 64, and a part of the air is supplied to the central portion of the protruding portion 12B as it is. The air guided to the base portion 12A from the duct 64 flows to the image light generation section 25, the color separation section 24, and the light combination section 31 of the light source section 23 and cools the respective sections. After that, the air present in the base portion 12A is discharged from the first exhaust port 70 and the second exhaust port 74.

According to one embodiment of the technique of the disclosure, the projector 10 comprises the first intake port 60 provided on the protruding portion 12B of the housing comprising the base portion 12A and the protruding portion 12B, and comprises the duct 64 that is an example of a guide mechanism for guiding the air, which is taken into the protruding portion 12B by the first intake fan 62, into the base portion 12A. With this configuration, the air taken in from the outside can be supplied to the image light generation section 25, the color separation section 24, the light combination section 31, and the like that are arranged in the base portion 12A. The temperature of the air taken in from the outside is lower than the temperature of the air present in the body part 12. Accordingly, the air is taken into the body part 12 from the outside, so that various heat sources, such as the image light generation section 25, the color separation section 24, the light combination section 31, and the power source circuit of the control board 22, can be cooled.

The body part 12, which is an example of the housing, is formed of the base portion 12A and the protruding portion 12B that protrudes from one surface of the base portion 12A, and has an L-shape as a whole in a plan view. For this reason, in appearance, the protruding portion 12B looks as if a part of the base portion 12A protrudes. With regard to the inside of the body part 12, the inside of the protruding portion 12B is formed in the shape of a bag which is a dead end and through which air cannot pass in a case where the inside of the protruding portion 12B is seen from the base portion 12A. In this case, it is difficult to supply air to the protruding portion 12B by merely taking in air from the base portion 12A without providing an intake port on the protruding portion 12B. According to the technique of the disclosure, air is taken in from the intake port provided on the protruding portion 12B and the taken air can be supplied to the base portion 12A by the guide mechanism. Accordingly, even in a case where the body part 12, which is an example of the housing, has an L-shape in a plan view, the air can be distributed to the entire inside of the body part 12 as compared to a case where the protruding portion 12B is not provided with an intake port. Even in a case where the housing has an L-shape in a plan view, the cooling effects of the plurality of heat sources arranged in the housing to be dispersed can be improved.

Further, in this example, the control board 22 is disposed to be close to the second side surface 13B of the base portion 12A. The control board 22 is provided with the power source circuit and the power source circuit is one of the main heat sources. For this reason, in a case where outside air is adapted to be taken in from the second side surface 13B, the taken outside air is warmed by the heat of the control board 22 and the wormed air is supplied to each portion of the base portion 12A. In this case, the cooling effect of the power source circuit is high, but there is a concern that the cooling effects of the other heat sources will be significantly lowered. In a case where outside air is taken in from the protruding portion 12B and the taken air is guided to the base portion 12A by the guide mechanism as in this example, it is possible to supply air to the base portion 12A while avoiding the influence of a heat source on a temperature rise. For this reason, the heat sources provided at the respective portions of the base portion 12A can be relatively evenly cooled.

In addition, the first intake port 60 is formed on the first side surface 13A facing the projection lens 11 as shown in FIG. 9 in this example. As a result, the first side surface 13A is positioned near the middle of the base portion 12A in the horizontal direction in FIG. 9. Further, air taken in from the first side surface 13A is guided to the base portion 12A by the duct 64. Since the first side surface 13A is positioned near the middle, air for cooling is likely to be supplied to the vicinity of the middle of the base portion 12A through the duct 64. For this reason, the cooling effect of a heat source disposed near the middle of the base portion 12A is high as compared to, for example, a case where air is supplied from both side surfaces of the base portion 12A. The reason for this is that a distance to the heat source disposed near the middle of the base portion 12A from the intake port can be shortened. Since the image light generation section 25 is disposed near the middle of the base portion 12A in this example, the cooling effect of the image light generation section 25 can be improved.

For example, a method including disposing the first intake port 60 on the third side surface 13C of the protruding portion 12B and lengthening the duct 64 to dispose the opening 64b near the middle of the base portion 12A is also considered as a method of supplying outside air, which is taken in from the protruding portion 12B, to the base portion 12A. Even in this case, the projector 10 can guide air for cooling to the vicinity of the middle of the base portion 12A. However, in a case where the first side surface 13A is provided with the first intake port 60 as in this example, air for cooling can be guided to the vicinity of the middle of the base portion 12A without an increase in the length of the duct 64. For this reason, a space in which a long duct is to be disposed can be reduced. Intake efficiency is higher as the duct is shorter.

Since the first intake port 60 is the shadow of the projection lens 11 in a case where the first intake port 60 is formed on the first side surface 13A as in this example, the intrusion of dust and dirt from the first intake port 60 can be suppressed by the projection lens 11. Further, since the first intake port 60 is the shadow of the projection lens 11, the first intake port 60 is difficult to be visually recognized from the outside. As a result, the body part 12 having a neat appearance is obtained. There is also a method including providing intake ports at positions facing the image light generation section 25 on the main surfaces 13G and 13H of the base portion 12A as a method of introducing outside air to the vicinity of the middle of the base portion 12A. However, in a case where the main surfaces 13G and 13H are provided with intake ports, there is a problem that the designability of appearance is impaired. In a case where the first intake port 60 is formed on the first side surface 13A as in this example, outside air is likely to be introduced to the vicinity of the middle of the base portion 12A while a reduction in the designability of appearance is suppressed.

Further, in this example, in the body part 12 that is an example of the housing, the second side surface 13B, which has the same orientation as the first side surface 13A, is provided with the first exhaust port 70 and the third side surface 13C, which has an orientation opposite to the orientation of the first side surface 13A, is provided with the second exhaust port 74. For this reason, air taken in from the first intake port 60 can flow in the horizontal direction of the base portion 12A shown in FIG. 9 in the body part 12. Accordingly, air for cooling can be evenly distributed in the body part 12. Furthermore, in the body part 12, surfaces, which have different orientations, are provided with the first exhaust port 70 and the second exhaust port 74, respectively. Accordingly, air can be discharged smoothly without being stayed in the body part 12 as compared to a case where only one surface is provided with an exhaust port. It can be expected that the amount of low-temperature outside air to be taken in per unit time is also increased in a case where air is discharged smoothly. Accordingly, a cooling effect can be improved.

Modification Example of Disposition of First Intake Port

An example in which the first intake port 60 provided on the protruding portion 12B is formed on the first side surface 13A has been described in the above-mentioned example, but a surface on which the first intake port 60 is formed is not limited to the first side surface 13A and the other surface of the protruding portion 12B may be provided with the first intake port 60. As long as the first intake port 60 is formed on the protruding portion 12B even though the first intake port 60 is not formed on the first side surface 13A, outside air taken in from the protruding portion 12B can be supplied to the base portion 12A by the guide mechanism of which an example is shown as the duct 64. For this reason, even in a case where the housing of which an example is shown as the body part 12 has an L-shape in a plan view, an effect of improving the cooling effect of the plurality of heat sources arranged in the housing to be dispersed is obtained.

Further, an example in which the first side surface 13A is further provided with the first intake port 60 for the purpose of facilitating the supply of air for cooling to the vicinity of the middle of the base portion 12A has been described in the above-mentioned example. However, the first side surface 13A does not necessarily need to be provided with the first intake port 60 in order to obtain the same effects.

Figure 10:
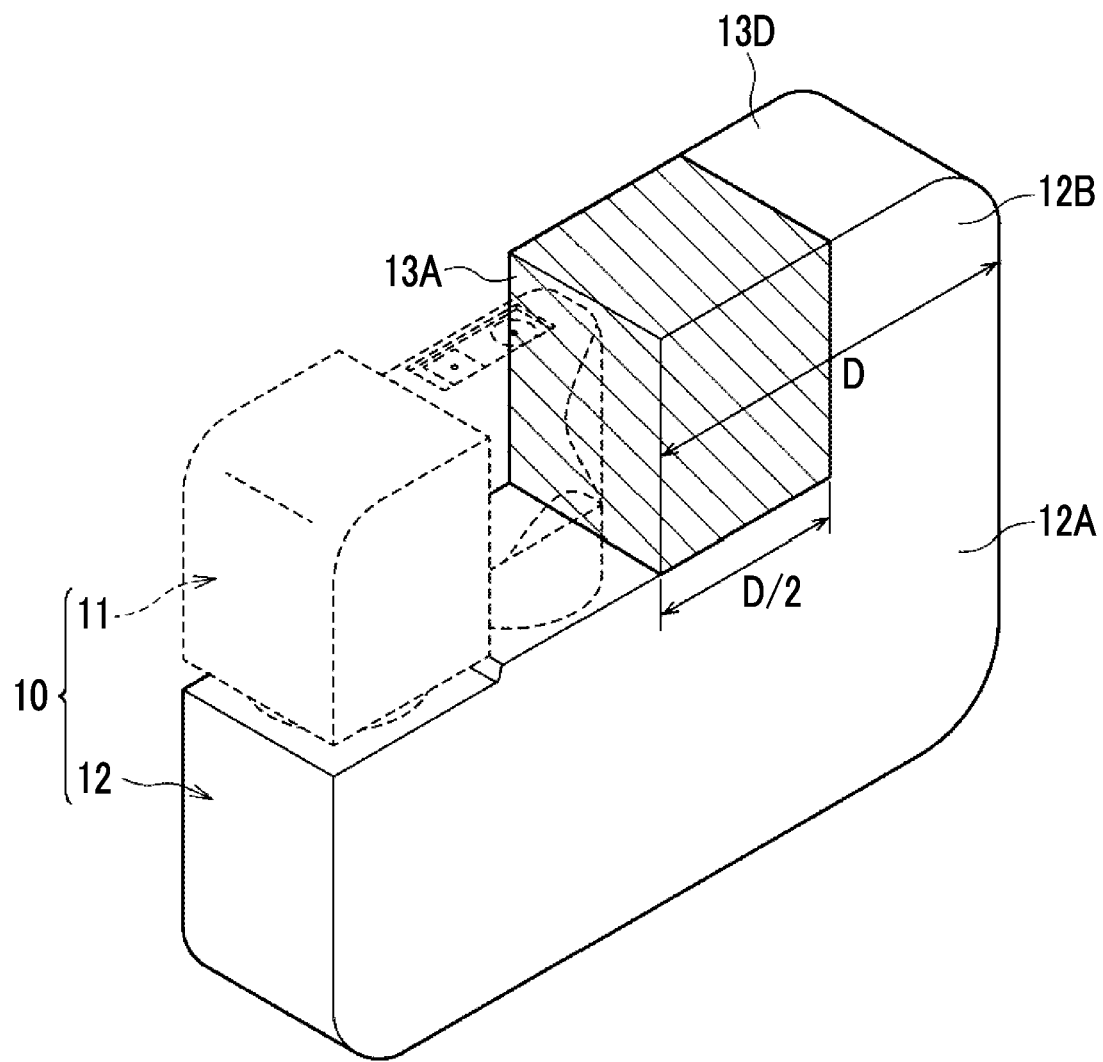
FIG. 10 is a diagram illustrating a region of the protruding portion facing a projection lens.

For example, as long as the first intake port 60 is formed in a region of the protruding portion 12B close to the projection lens 11, the same effects as in a case where the first side surface 13A is provided with the first intake port 60 can be obtained. The region of the protruding portion 12B facing the projection lens 11 is a region shown by hatching with diagonal lines in FIG. 10. This region is a region of the protruding portion 12B that is closer to the projection lens 11 than the middle of a distance D between a position closest to the projection lens 11 and a position farthest from the projection lens 11. Such a region is close to the vicinity of the middle of the base portion 12A in the protruding portion 12B. For this reason, as long as the first intake port 60 is provided in the region facing the projection lens 11, which is shown by hatching in FIG. 10, other than the first side surface 13A, the same effects as in a case where the first side surface 13A is provided with the first intake port 60 can be expected.

Of course, since the first side surface 13A is a surface that is the shadow of the projection lens 11 as described above, various effects, such as an effect of suppressing the entry of dust and dirt and an effect of suppressing the deterioration of the designability of appearance, are obtained in a case where the first side surface 13A is provided with the first intake port 60. For this reason, considering such a viewpoint, it is more preferable that a surface to be provided with the first intake port 60 is the first side surface 13A.

Modification Example 1 of Guide Mechanism

The image forming unit 20 including the light source section 23, the color separation section 24, and the image light generation section 25 may be integrally stored in an enclosure in the body part 12. In such a case, it is preferable that the guide mechanism is adapted to guide air, which is taken in from the first intake port 60, to two main surfaces, which face each other, of the enclosure provided in the base portion 12A. Here, the two main surfaces, which face each other, of the enclosure are surfaces facing the two main surfaces 13G and 13H of the body part 12, which face each other, respectively. The areas of the two main surfaces, which face each other, of the enclosure are larger than the areas of the side surfaces that are in contact with the sides of the main surfaces, respectively. For this reason, in a case where the two main surfaces are cooled, the image forming unit 20 provided in the enclosure can be cooled as a whole.

Figure 11:
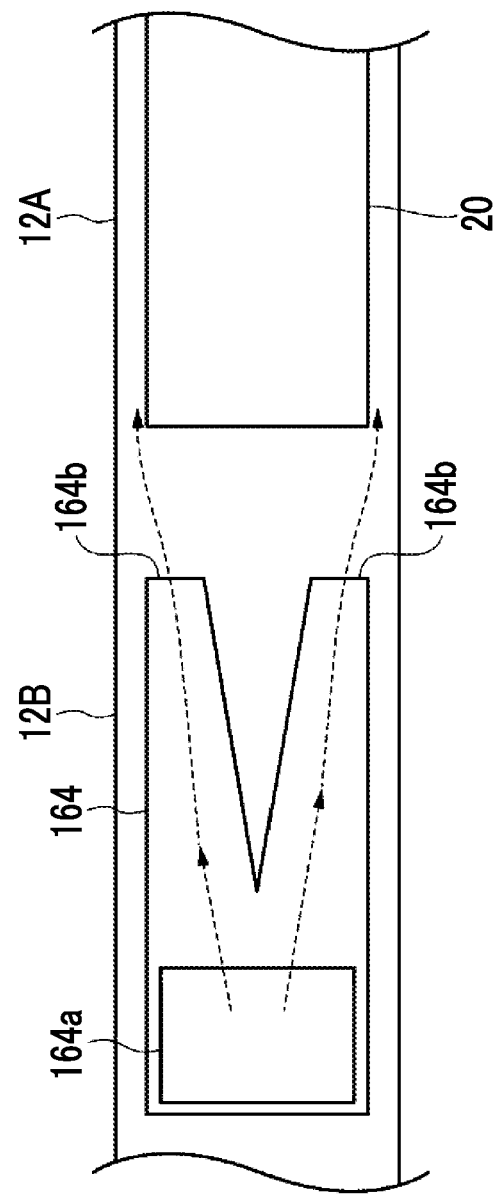
FIG. 11 is a diagram illustrating an example in which the design of a guide mechanism is changed.

Specifically, the use of a duct 164, which is an example of the guide mechanism, is considered as shown in FIG. 11. The duct 164 has a shape where an end portion of the duct 164 facing the base portion 12A is formed to bifurcate, includes two openings 164b separated from each other in a vertical direction, and guides air taken in from an opening 164a facing the first intake port to both the main surfaces of the base portion 12A. Accordingly, since air is blown to both main surfaces of the image forming unit 20 stored in the enclosure, the entire image forming unit 20 can be cooled as a whole.

Modification Example 2 of Guide Mechanism

Figure 12:
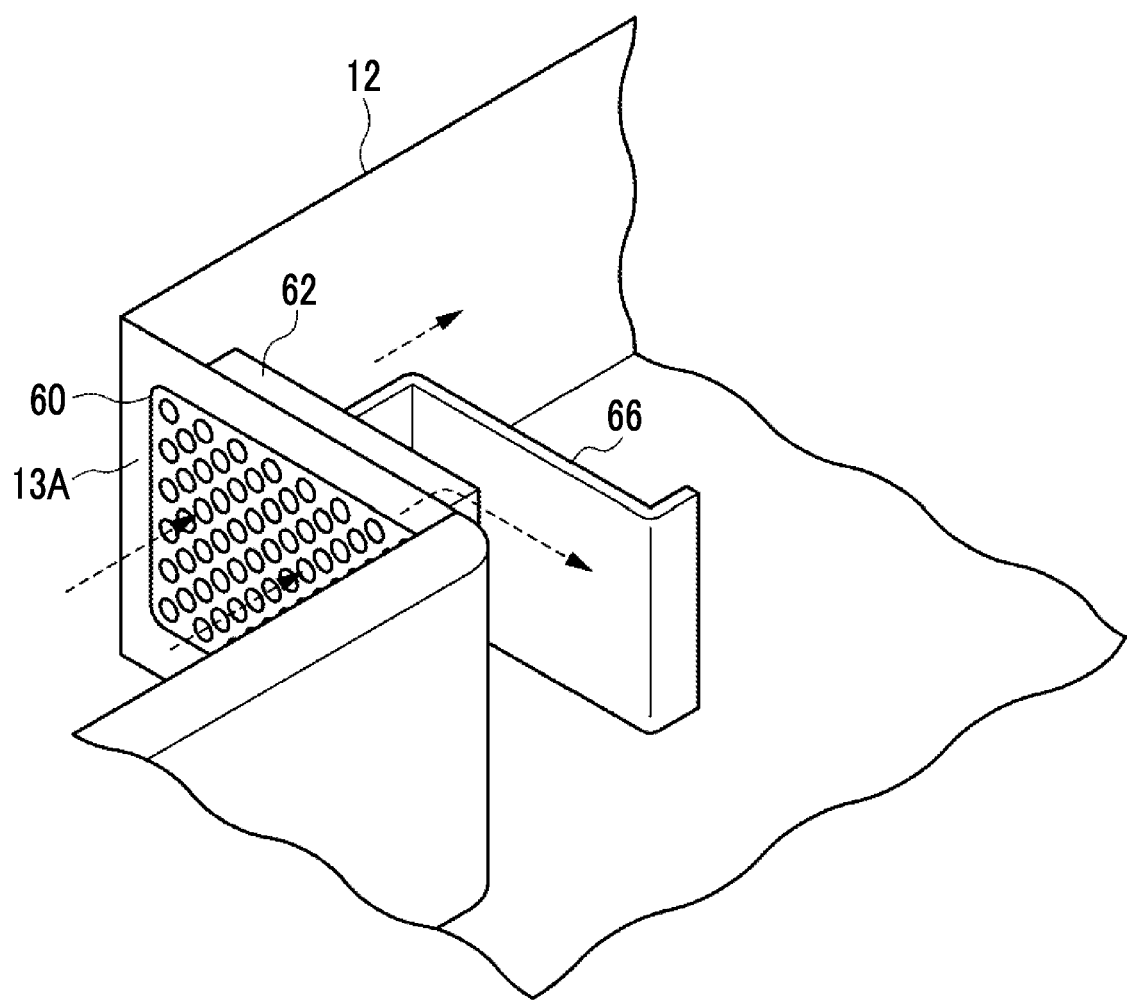
FIG. 12 is a diagram illustrating a partition member that is an example in which the design of a guide mechanism is changed.

The ducts 64 and 164 have been described as the guide mechanism by way of example in the above-mentioned examples, but the guide mechanism is not limited to a tubular member, such as a duct. For example, a partition member provided in the housing is considered as an example of the guide mechanism other than the duct. For example, a partition plate 66 that is a plate-like partition member provided in the protruding portion 12B shown in FIG. 12 is used as the partition member. The partition plate 66 shown in FIG. 12 has the shape of a crank of which both ends are bent at an angle of 90° to have opposite orientations. However, the partition plate 66 may have only to be adapted to guide at least a part of air, which is taken in by the first intake fan 62, to the base portion 12A, and may have, for example, an L-shape and the like.

Figure 13:
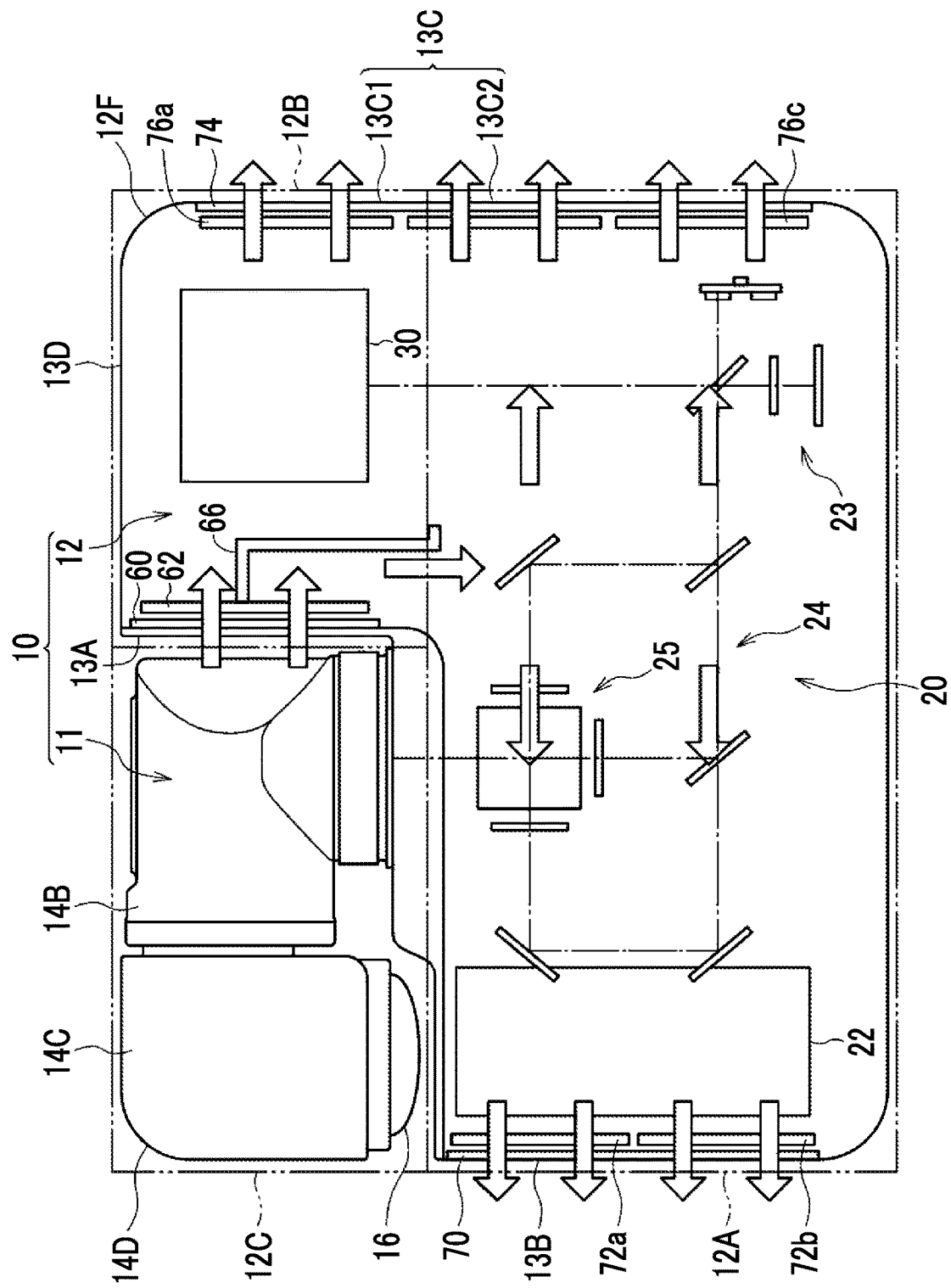
FIG. 13 is a diagram showing the flow of air inside the body part of the projector in a case where the partition member is provided as a guide mechanism.

Even in a case where the partition plate 66 is provided as the guide mechanism, the same flow of air as in a case where the duct 64 is provided is generated as shown in FIG. 13 and the cooling effects of the heat sources arranged in the base portion 12A are improved.

Figure 14:
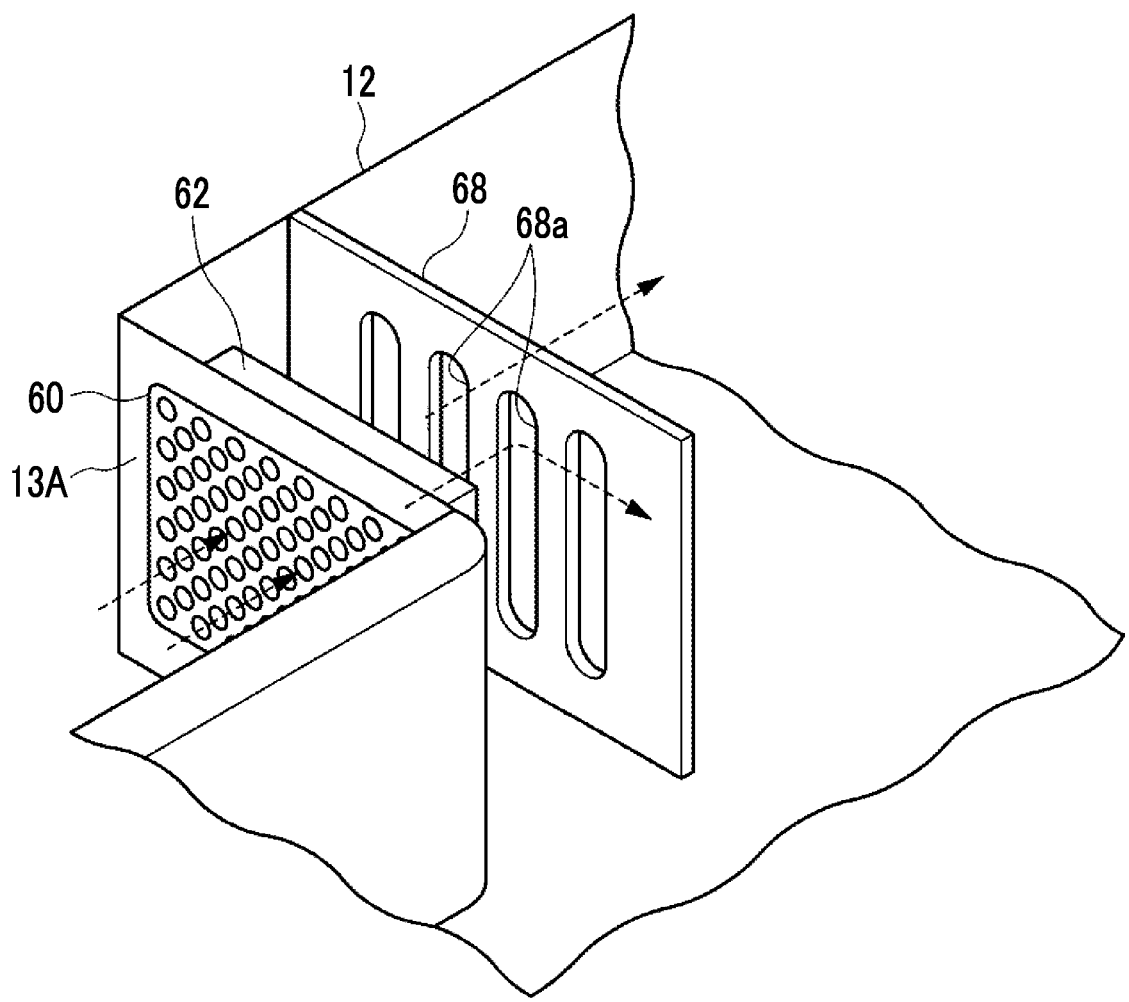
FIG. 14 is a diagram illustrating another partition member that is an example in which the design of a guide mechanism is changed.

Further, the guide mechanism may be a partition plate 68 shown in FIG. 14. The partition plate 68 is provided with openings 68a, and causes a part of air, which is taken in by the intake fan 62, to pass and to flow into the protruding portion 12B and guides the other part of the air to the base portion 12A. Even in a case where the partition plate 68 is provided, substantially the same flow of air as in a case where the duct 64 is provided is generated and the cooling effects of the heat sources arranged in the base portion 12A are improved.

Whether or not the guide mechanism is formed of the duct or the partition member is appropriately determined in consideration of a space, the layout of the respective components, and the like in the body part 12.

As for the Amount of Air to be Discharged

Figure 15:
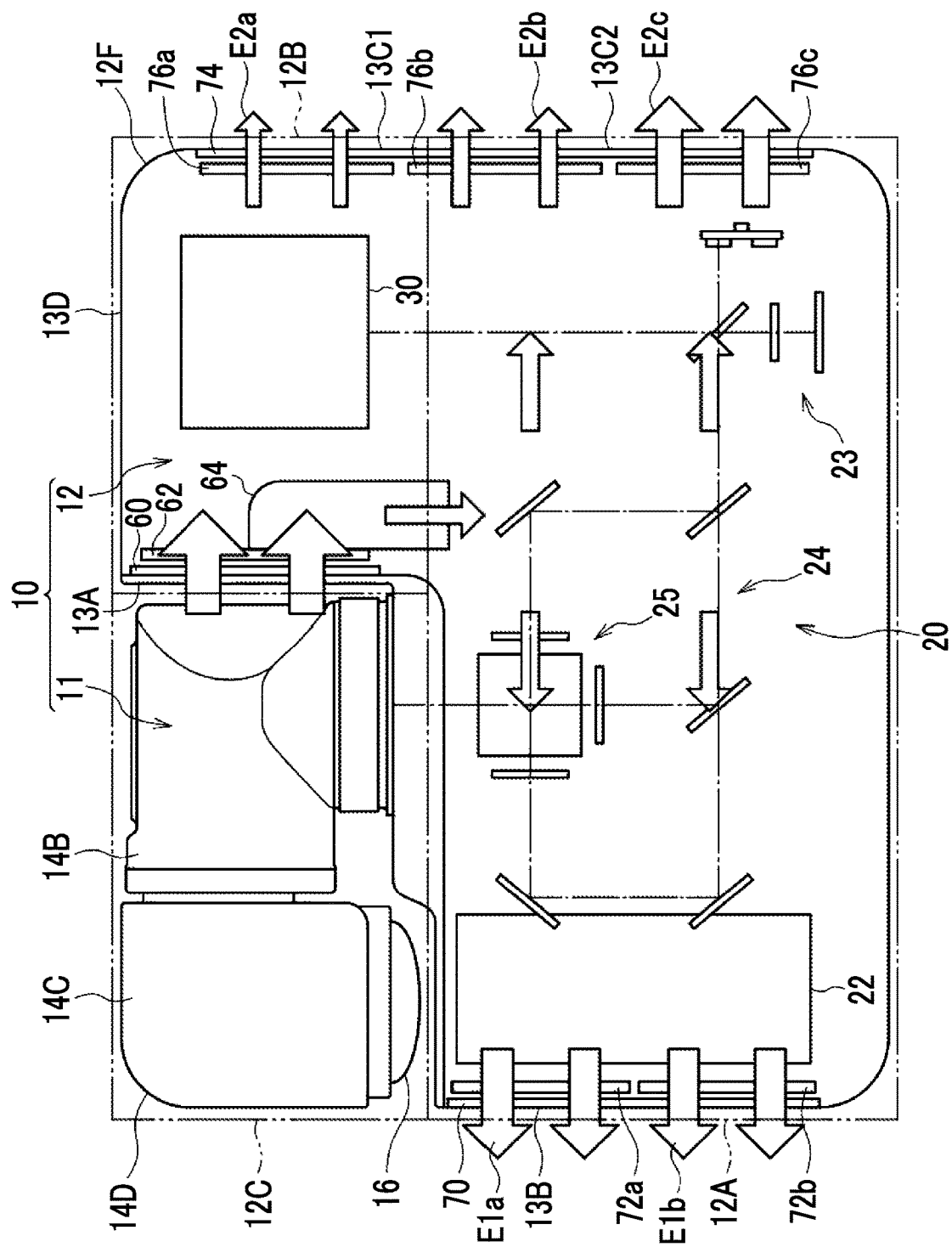
FIG. 15 is a diagram illustrating the amount of air to be discharged from an exhaust fan.

In the projector 10 according to this embodiment described with reference to FIGS. 1 to 9, the amounts E1a, E1b, E2a, E2b, and E3b of air to be discharged from the plurality of exhaust fans 72a, 72b, 76a, 76b, and 76c may be equal to each other. On the other hand, as shown in FIG. 15, among the plurality of exhaust fans, the number of rotations of the exhaust fan, which is far from the first intake fan 62, per unit time may be set to be larger than the number of rotations of the exhaust fan, which is close to the first intake fan 62, per unit time. Accordingly, the flow of air taken in from the first intake fan 62 is likely to spread to a position away from the first intake fan 62. In a case where two exhaust fans are provided, air is difficult to reach the exhaust fan since the amount of air drawn to the position of the exhaust fan is smaller as an exhaust fan is farther. Accordingly, in a case where the number of rotations of the exhaust fan far from the first intake fan is set to be large, a reduction in the amount of air to be drawn can be suppressed. Therefore, the amounts of air to be discharged from the respective exhaust fans can be made uniform. The plurality of exhaust fans have different distances from the first intake fan 62, but may include an exhaust fan group of which exhaust fans have the same number of rotations per unit time. Further, the size of a fan (blade) of a specific exhaust fan may be increased as another means for increasing the amount of air to be discharged from the specific exhaust fan.

A distance between the first intake fan 62 and each of the exhaust fans 72a, 72b, 76a, 76b, and 76c will be described with reference to FIG. 16.

Figure 16:
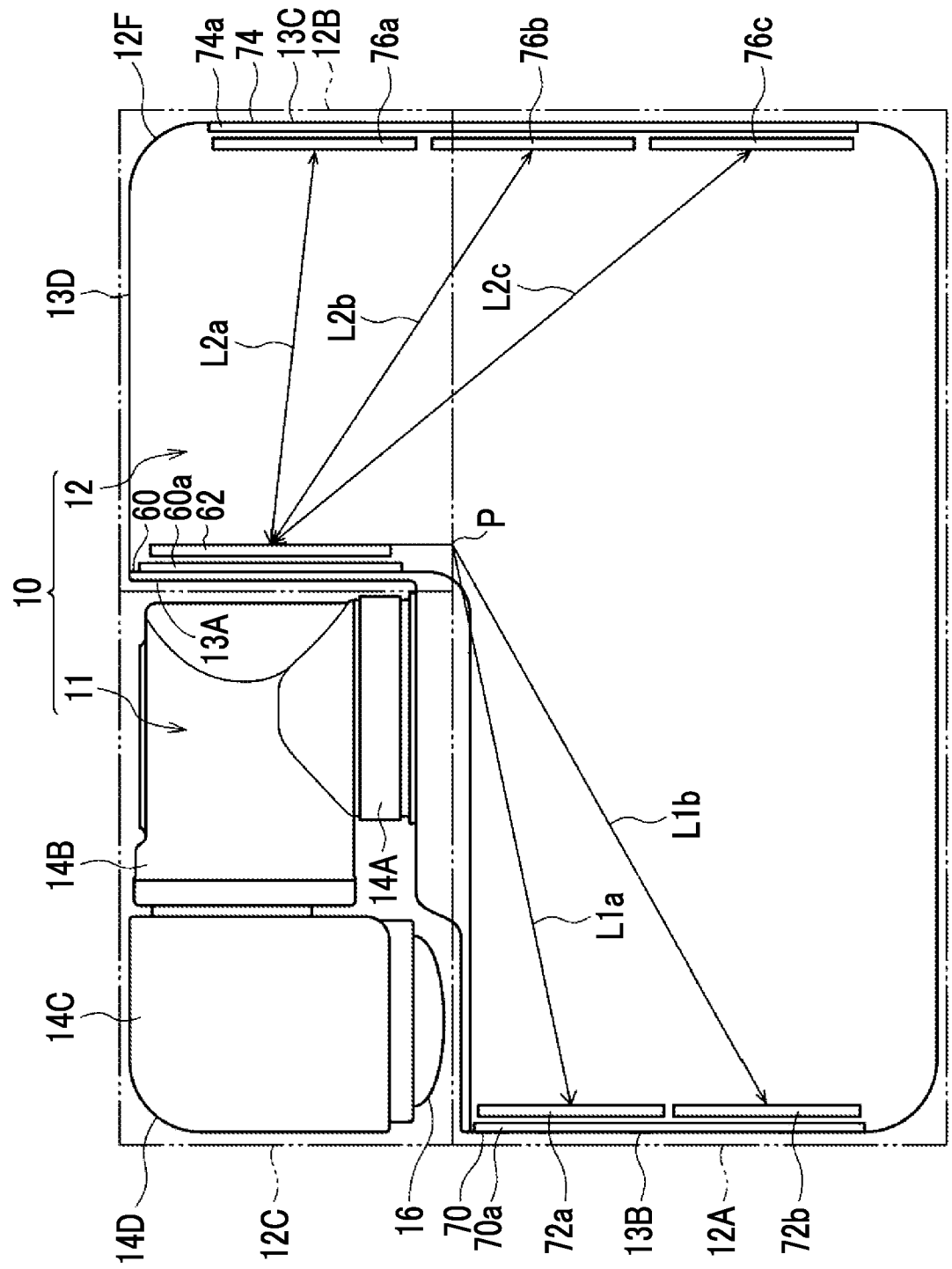
FIG. 16 is a diagram illustrating a distance between the exhaust fan and a first intake fan.

In a plan view shown in FIG. 16, with regard to exhaust fans, such as the second exhaust fans 76a, 76b, and 76c, in which the entire line segment connecting the center of the first intake fan 62 to the center of the exhaust fan is present in the housing, the length of the line segment is defined as a distance between the exhaust fan and the first intake fan 62. On the other hand, in a case where a part of a line segment connecting the center of the first intake fan 62 to the center of an exhaust fan is out of the housing as in the first exhaust fans 72a and 72b, the distance is defined as follows. First, an intersection P between the extension line of the surface of the first intake fan 62, which faces the inside of the housing, and a boundary line between the protruding portion 12B and the base portion 12A is obtained. Then, the sum of the length of a line segment connecting the intersection P to the center of the first intake fan 62 and the length of a line segment connecting the intersection P to the center of the exhaust fan is defined as a distance between the exhaust fan and the first intake fan 62.

As shown in FIG. 16, a distance between the first intake fan 62 and the second exhaust fan 76a is denoted by L2a, a distance between the first intake fan 62 and the second exhaust fan 76b is denoted by L2b, and a distance between the first intake fan 62 and the second exhaust fan 76c is denoted by L2c. Further, a distance between the first intake fan 62 and the first exhaust fan 72a is denoted by L1a, and a distance between the first intake fan 62 and the first exhaust fan 72b is denoted by L1b. Here, the respective distances satisfy a relationship of "$L2a<L2b<L2c<L1a<L1b$".

Assuming that the numbers and shapes (including thicknesses) of blades are substantially the same, in a case where the plurality of exhaust fans have the same diameter, the amount of air to be discharged is larger as the number of rotations of the exhaust fan per unit time is larger. Here, the numbers of rotations of the first exhaust fans 72a and 72b are denoted by R1a and R1b, respectively, and the numbers of rotations of the second exhaust fans 76a, 76b, and 76c are denoted by R2a, R2b, and R2c, respectively. In this case, a relationship of "$R2a<R2b<R2c<R1a<R1b$" is set so that the number of rotations of an exhaust fan is larger as the exhaust fan is farther from the first intake fan.

Further, in a case where the number of blades of the exhaust fan and the shape of the blade of the exhaust fan are changed or the diameter of the exhaust fan is changed, the amount of air to be discharged from the exhaust fan can be changed. Accordingly, as a distance from the first intake fan is longer, an exhaust fan of which the number of blades, the shape of the blade, and the diameter is changed and which discharges a larger amount of air can also be disposed to realize the above-mentioned relationship of the amount of air to be discharged.

Furthermore, in a case where the number of intake fans is smaller than the number of exhaust fans as in this example, it is preferable that the amount of air to be taken in from the first intake fan 62 is set to be larger than the average of the amounts of air to be discharged from the plurality of exhaust fans 72a, 72b, 76a, 76b, and 76c. The reason for this is to balance intake air and exhaust air.

Modification Example of the Number of Intake Port

Figure 17:
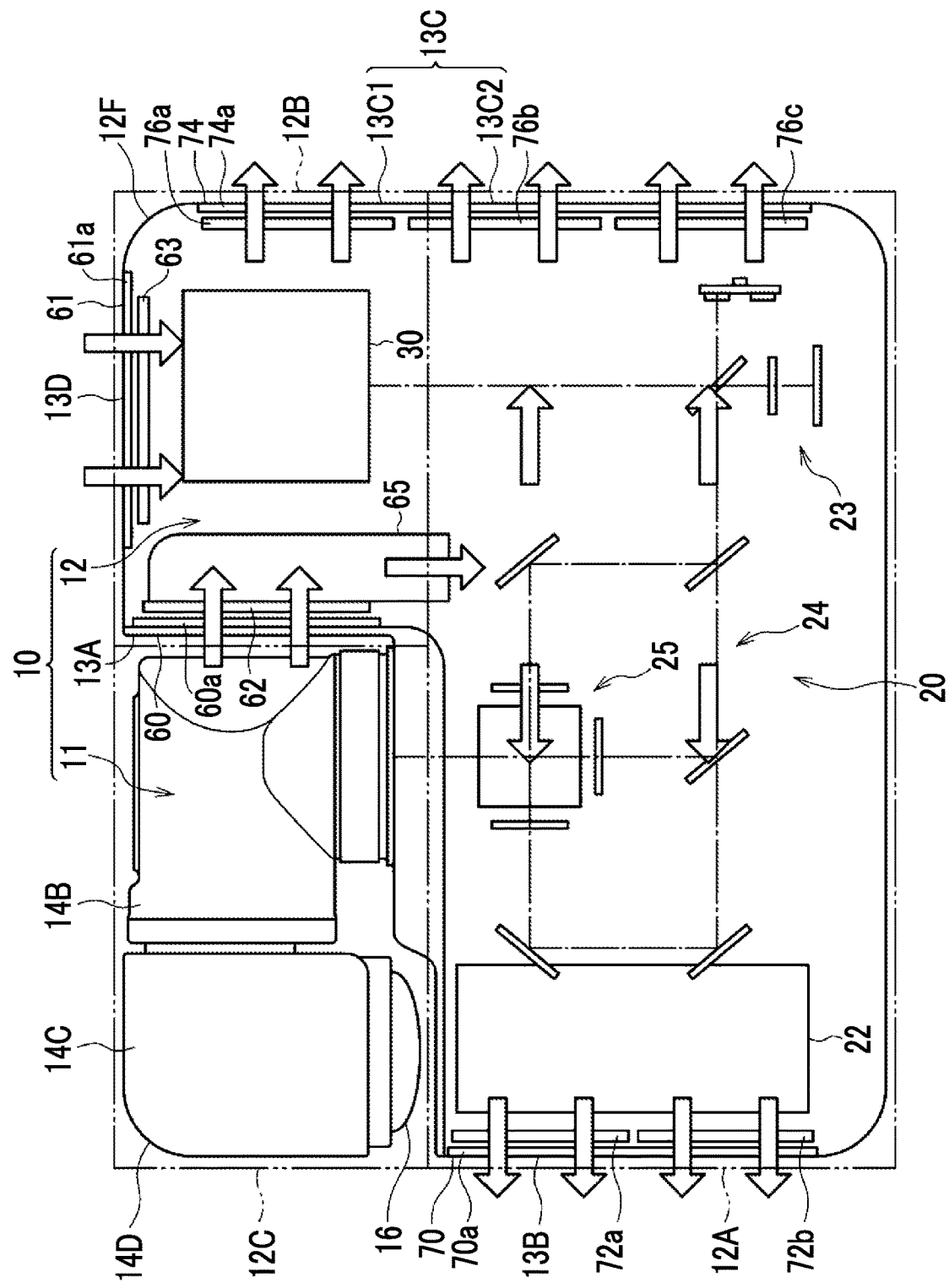
FIG. 17 is a plan view showing the schematic configuration of the inside of a body of a projector of an example in which design is changed.

The first side surface 13A of the protruding portion 12B is provided with only the first intake port 60 as the intake port in the embodiment, but may be further provided with a second intake port 61 as shown in FIG. 17. A porous member 61a is disposed even in the second intake port 61. FIG. 17 shows a schematic plan view of a projector 10 according to a modification example. In the following description, the same elements as those of the projection device according to the embodiment will be denoted by the same reference numerals as those of the projection device according to the embodiment and the detailed description thereof will be omitted.

In the projector 10 shown in FIG. 17, the second intake port 61 is formed on the fourth side surface 13D intersecting the first side surface 13A of the protruding portion 12B and a second intake fan 63, which takes in air serving as gas from the second intake port 61 into the protruding portion 12B, is provided. Further, the projector 10 shown in FIG. 17 comprises a duct 65 that covers the entire surface of the first intake fan 62.

With the above-mentioned configuration, almost all air taken into the protruding portion 12B from the first intake port 60 is guided to the base portion 12A by the duct 65 and is supplied into the base portion 12A. On the other hand, air taken into the protruding portion 12B from the second intake port 61 is blown to the light emitting module 30. A part of the air blown to the light emitting module 30 is discharged to the outside by the second exhaust fan 76a, which is provided in the protruding portion 12B, before flowing into the base portion 12A. Further, the other part of the air is discharged by the second exhaust fans 76b and 76c after flowing into the base portion 12A.

Since the second intake port 61 is provided in addition to the first intake port 60, the first intake port 60 is provided with the first intake fan 62, and the second intake port 61 is provided with the second intake fan 63 as described above, the cooling effects of the plurality of heat sources arranged in the housing to be dispersed can be further improved. That is, in the example shown in FIG. 17, the second intake port 61 and the second intake fan 63, which are added, can be mainly used for the cooling of the light emitting module 30 that is one of main heat sources. For this reason, the cooling effect of each of the heat sources provided in the base portion 12A and the heat source provided in the protruding portion 12B can be further improved as compared to a case where only the first intake port 60 and the first intake fan 62 are provided.

For example, the LCD 50 for red light, the LCD 52 for green light, and the LCD 54 for blue light consisting of transmission type LCDs have been used as electro-optical elements in the above-mentioned example, but the electro-optical elements are not limited thereto. The transmission type image forming panel is not limited to an LCD, and may be, for example, a micro electro mechanical systems (MEMS) shutter panel.

Mechanism for Changing Exhaust Direction

Figure 18:
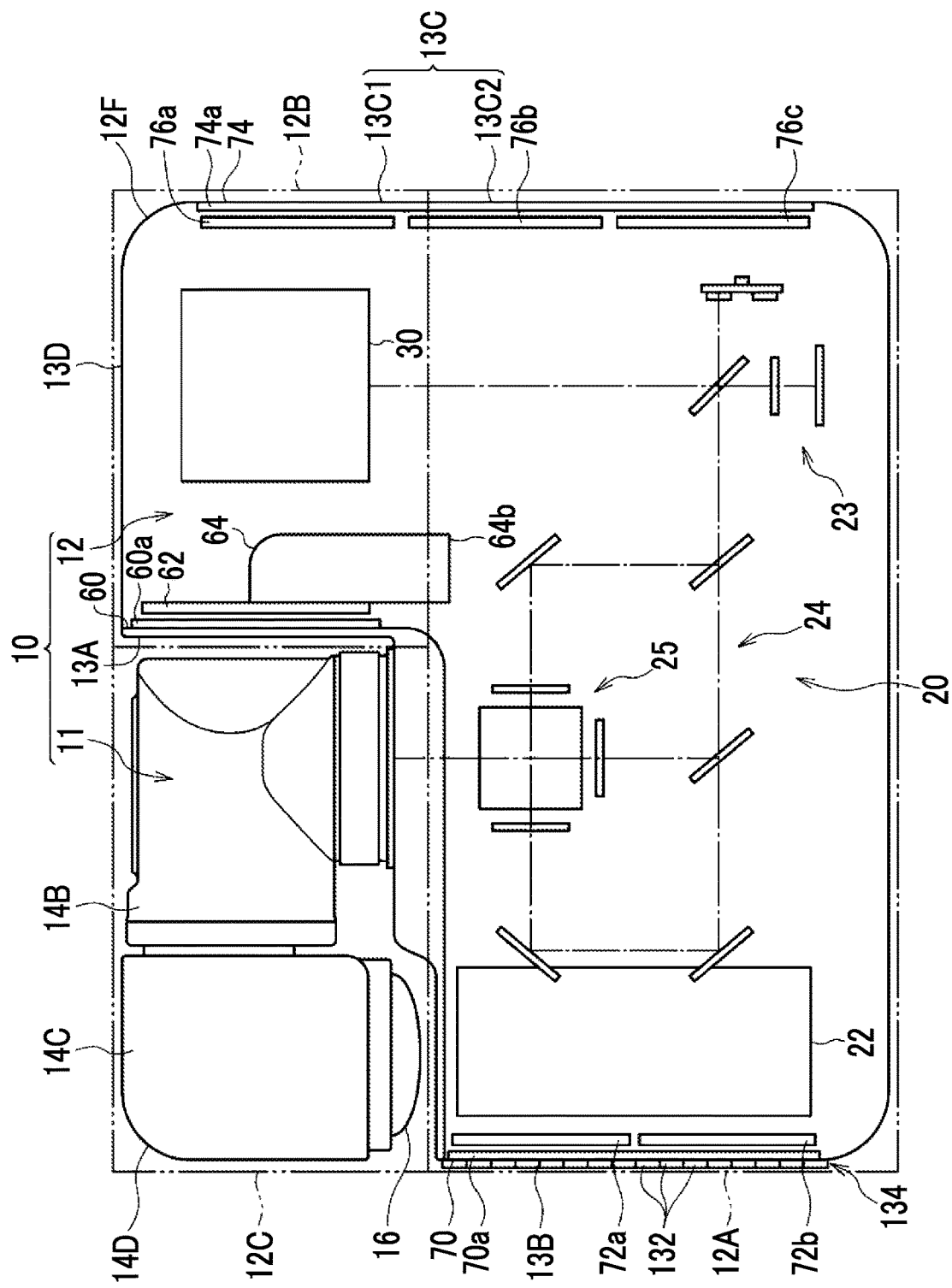
FIG. 18 is a plan view showing the schematic configuration of the inside of a body of a projector of an example in which design is changed.

Further, in the projector 10 according to this embodiment, as shown in FIG. 18, the second side surface 13B may be provided with a variable mechanism 130 that changes the exhaust direction of air. The variable mechanism 130 comprises a variable louver 134 that has configuration in which a plurality of elongated louver slats 132 are arranged in parallel, and a louver controller 136 (see FIG. 19).

The variable louver 134 is disposed outside the first exhaust port 70. The angle of each louver slat 132 of the variable louver 134 is variable, and the angle of each louver slat 132 can be changed to change the discharge direction of air.

Figure 19:
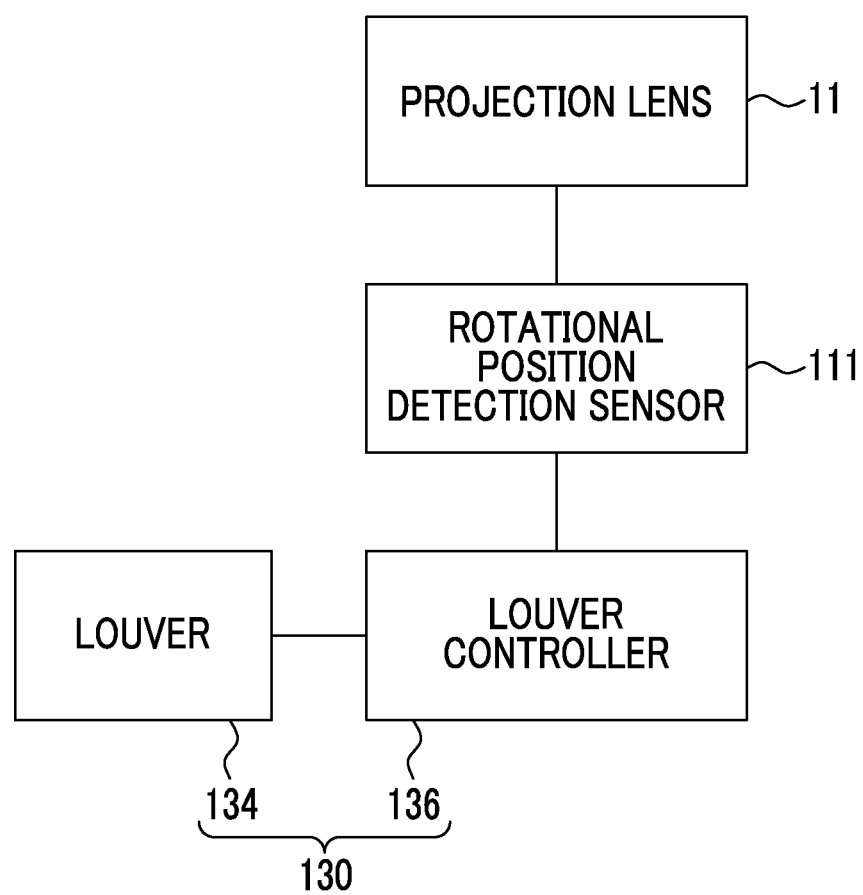
FIG. 19 is a block diagram showing the control configuration of a louver.

The louver controller 136 changes the angle of each louver slat 132 of the variable louver 134 in conjunction with the projection direction of image light that is projected by the projection lens 11. The projector 10 comprises a rotational position detection sensor 111 that detects the rotational position of the projection lens 11 about the first optical axis A1 and the rotational position of the projection lens 11 about the second optical axis A2. The projection direction of image light, which is projected by the projection lens 11, is determined depending on the rotational position about the first optical axis A1 and the rotational position about the second optical axis A2. As shown in FIG. 19, the louver controller 136 is connected to the rotational position detection sensor 111 that detects the rotational position of the projection lens 11 about the first optical axis A1 and the rotational position of the projection lens 11 about the second optical axis A2. The louver controller 136 controls the angle of each louver slat 132 of the louver 134 on the basis of information about the rotational positions output from the rotational position detection sensor 111, that is, information about the projection direction of image light. For example, the louver controller 136 may be adapted to include a look-up table in which the projection direction of image light is associated with the angle of each louver slat and to adjust the angle of each louver slat to a louver slat angle corresponding to the detected projection direction.

With the above-mentioned configuration, the exhaust direction of air discharged from the first exhaust port 70 can be changed in conjunction with the projection direction of image light that is projected by the projection lens 11.

Figure 20:
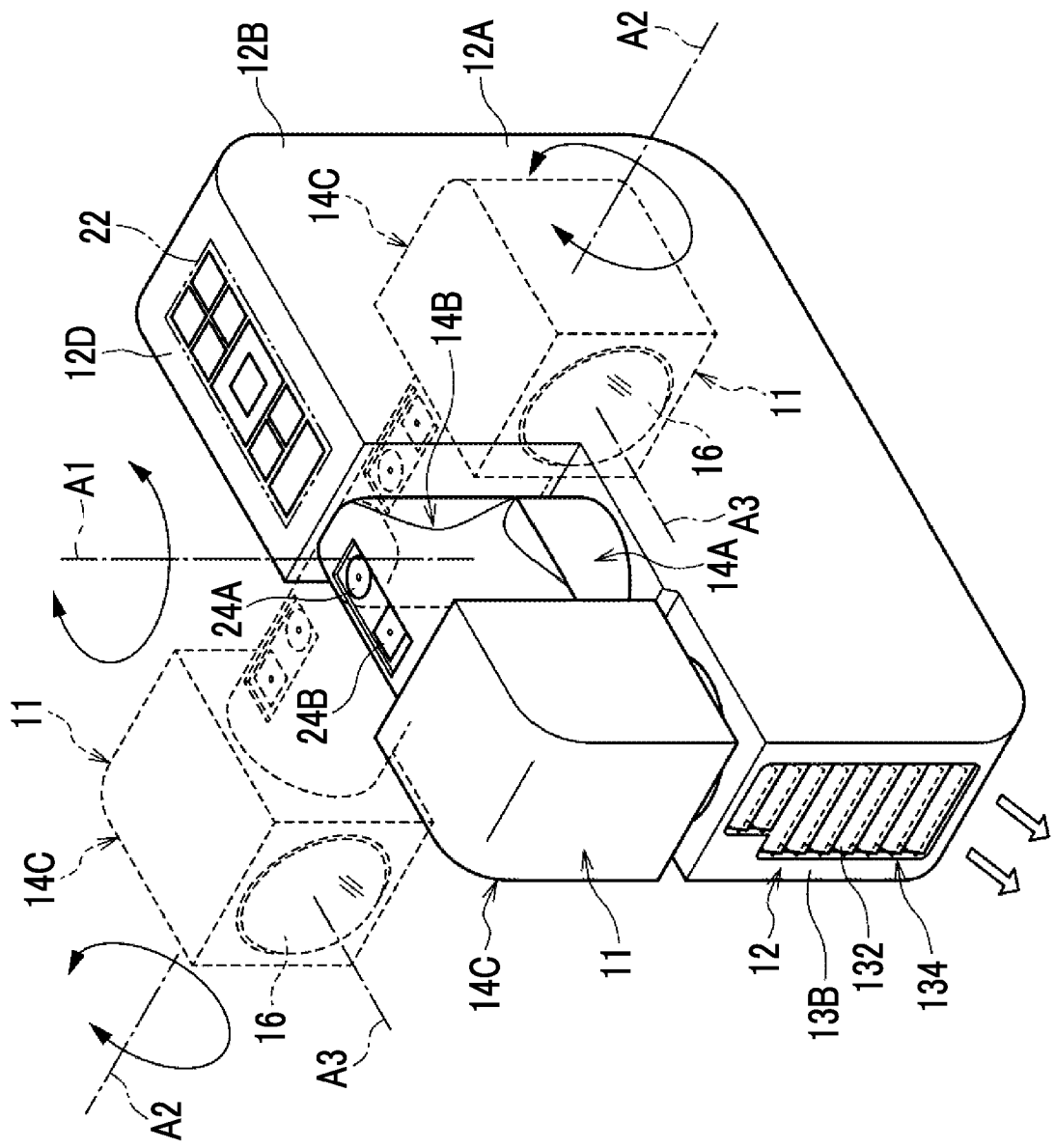
FIG. 20 is a diagram illustrating the projection direction of an image and the orientation of the louver.
Figure 21:
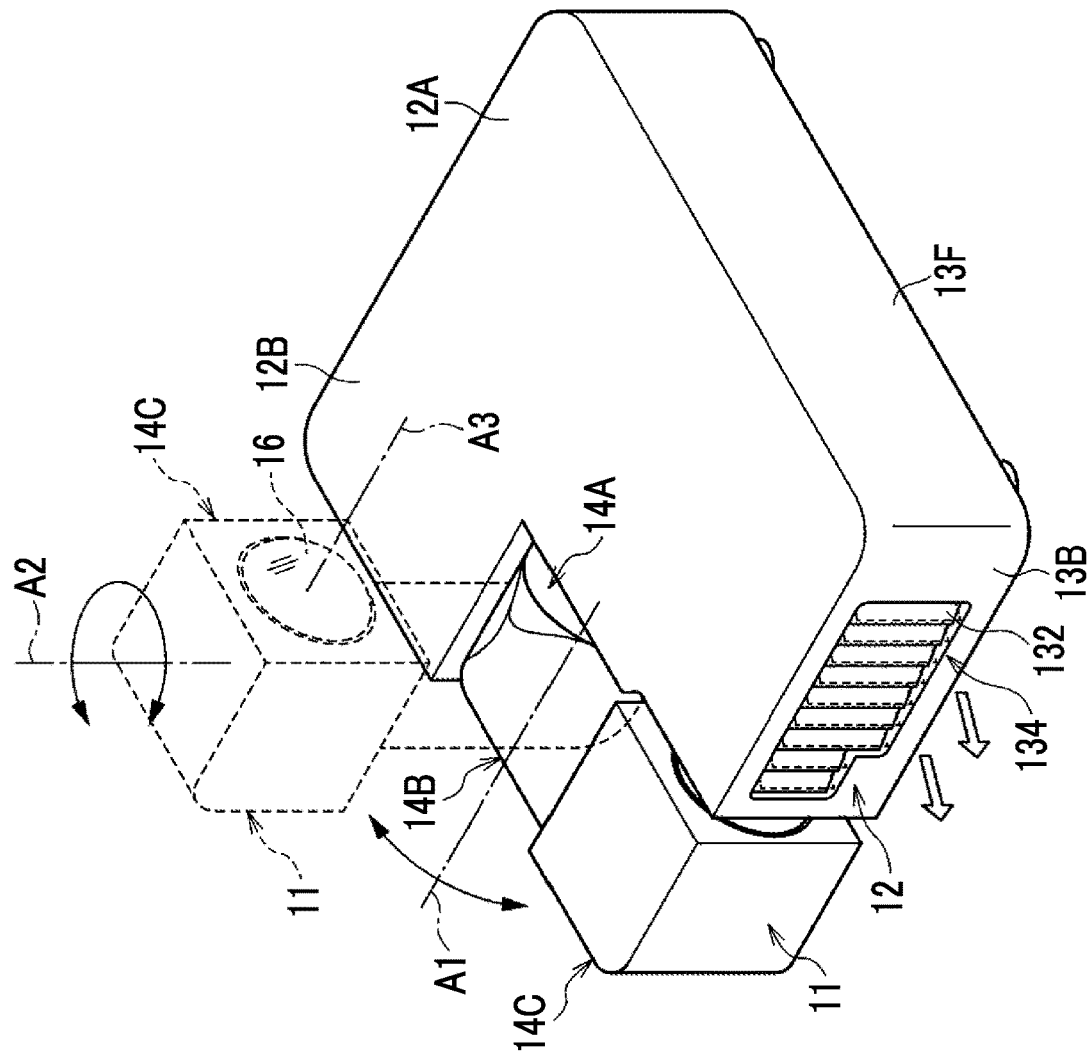
FIG. 21 is a diagram illustrating the projection direction of an image and the orientation of the louver.

It is preferable that the louver controller 136 changes the angle of each louver slat 132 so that the projection direction of image light projected by the projection lens 11 and the exhaust direction of air discharged from the second side surface 13B are different from each other. For example, in a case where the projection direction of image light projected by the projection lens 11 (the orientation of the third optical axis A3 shown by a broken line in FIG. 20) is the same as the orientation of the second side surface 13B as shown in FIG. 20, the louver controller 136 tilts the louver slats 132 of the variable louver 134 so that the exhaust direction is tilted downward with respect to the second side surface 13B. Further, for example, in a case where the projection direction of image light projected by the projection lens 11 (the orientation of the third optical axis A3 shown by a broken line in FIG. 21) is the same as the orientation of the sixth side surface 13F as shown in FIG. 21, the louver controller 136 tilts the louver slats 132 of the variable louver 134 so that the exhaust direction of air discharged from the second side surface 13B is opposite to the projection direction.

In a case where the angle of each louver slat 132 is changed as described above so that the projection direction of image light projected by the projection lens 11 and the exhaust direction of air discharged from the second side surface 13B are different from each other, the entry of hot air discharged from the exhaust port into the projection range of image light projected from the projection lens 11 can be suppressed. In a case where the entry of hot air into the projection range is suppressed, the fluctuation of an image caused by the hot air can be suppressed. Since it is possible to prevent the intrusion of dust and dirt from the exhaust port by keeping the louver in a closed state as shown in FIG. 18 in a case where the projector 10 is not in use, this is preferable.

In the above-mentioned example, the louver controller 136 has been provided and the angle of each louver slat has been automatically adjusted according to the projection direction of image light. However, the louver controller 136 may not be provided and the orientation of each louver slat may be manually changed.

Further, a louver is not limited to the variable louver 134, and a louver of which the angle of each louver slat is fixed may be provided. For example, a louver of which louver slats are mounted at an angle where a discharge direction is different from a projection direction to be frequently used may be provided.

Only the second side surface 13B has been provided with the variable louver 134 in the above-mentioned example, but only the third side surface 13C or both the second side surface 13B and the third side surface 13C may be provided with louvers. That is, in a case where the body part 12 includes the second side surface 13B that is provided on the base portion 12A and has the same orientation as the first side surface 13A or the third side surface 13C that is provided on the base portion 12A and has an orientation opposite to the orientation of the first side surface 13A, the projector 10 may comprise a variable mechanism that changes the exhaust direction of air discharged from the exhaust port (here, the first exhaust port or the second exhaust port) formed on the second side surface or the third side surface in conjunction with the projection direction of the projection lens. Further, the louver may not be provided and the number of rotations of an exhaust fan provided in an exhaust port provided on a surface having the same orientation as the projection direction of the projection lens may be reduced so that the amount of air to be discharged from the exhaust port is reduced. The louver controller 136 is formed in the control board 22 shown in FIG. 5 and the like, and is controlled by a control circuit.

Others

Figure 22:
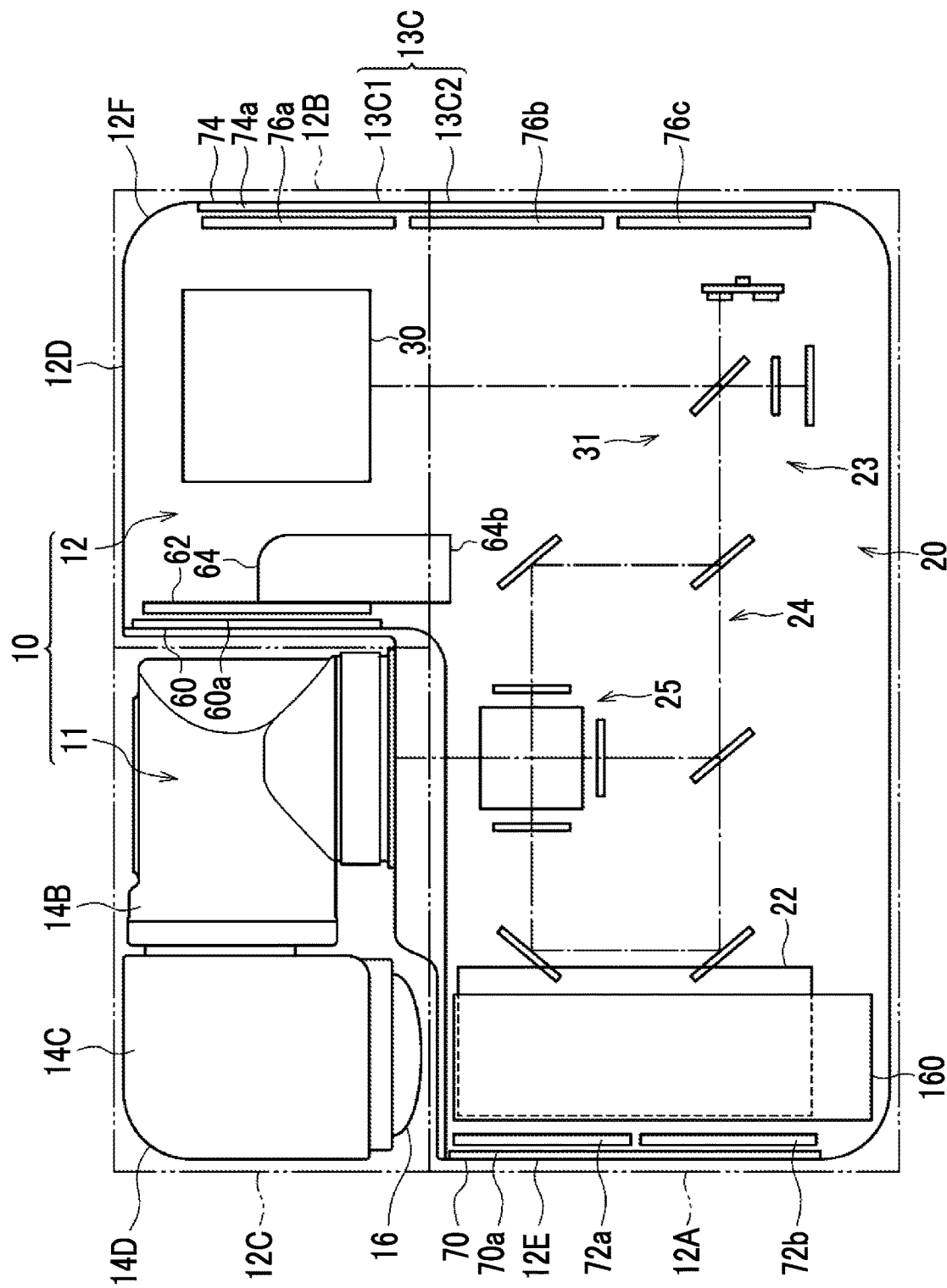
FIG. 22 is a plan view showing the schematic configuration of the inside of a body of a projector of an example in which design is changed.

An example in which the projector comprises the intake/exhaust mechanism serving as an air cooling mechanism for cooling heat sources with air as a cooling mechanism for heat sources has been described in each embodiment, but the projector may further comprise a liquid cooling mechanism for cooling heat sources with liquid. For example, a liquid cooling mechanism 160 can be disposed at a position partially overlapping with the control board 22 in a plan view as shown in FIG. 22. Since the projector comprises the liquid cooling mechanism, the cooling effect of each of the heat sources provided in the housing can be further improved. Examples of the structure of the liquid cooling mechanism are disclosed in, for example, JP2019-78913A or JP2013-164595A.

An example in which the light emitting module 30 included in the light source section 23 comprises the semiconductor lasers as the semiconductor light-emitting elements has been described in each embodiment, but the light emitting module 30 may include light emitting diodes as the semiconductor light-emitting elements. Further, an example in which the projector 10 comprises a yellow phosphor in the light combination section 31 of the light source section 23 has been described in the above-mentioned example, but the projector 10 may use a green phosphor and a red phosphor instead of the yellow phosphor. Furthermore, a green laser light source and a red laser light source may be used instead of the yellow phosphor. Alternatively, the light source section 23 is not limited to configuration that includes the light emitting module 30 and the light combination section 31, and may comprise a high-brightness lamp, such as a xenon lamp, a metal halide lamp, or a super high-pressure mercury lamp.

All documents, patent applications, and technical standards disclosed in this specification are incorporated in this specification by reference so that the incorporation of each of the documents, the patent applications, and the technical standards by reference is specific and is as detailed as that in a case where the documents, the patent applications, and the technical standards are described individually.

What is claimed is:

1. A projection device, comprising:
   a housing that includes a base portion and a protruding portion protruding from the base portion;
   a projection lens that projects image light onto a projection target, is disposed to face the protruding portion, and is mounted on the base portion;
   a prism that is disposed in the base portion to face an incident-side end part of the projection lens;
   a plurality of transmission type electro-optical elements that are arranged to face a plurality of side surfaces of the prism, respectively;
   a semiconductor light source that is disposed in the protruding portion and generates the image light; and
   a wavelength conversion element that is provided in the base portion and converts a wavelength of light emitted from the semiconductor light source,
   wherein the wavelength conversion element is disposed to be close to a side surface, which is closer to the protruding portion, of two side surfaces of the base portion facing each other.

2. A projection device, comprising:
   a housing that includes a base portion and a protruding portion protruding from the base portion;
   a projection lens that projects image light onto a projection target, is disposed to face the protruding portion, and is mounted on the base portion;
   a prism that is disposed in the base portion to face an incident-side end part of the projection lens;
   a plurality of transmission type electro-optical elements that are arranged to face a plurality of side surfaces of the prism, respectively;
   a semiconductor light source that is disposed in the protruding portion and generates the image light; and
   a control board that is disposed in the base portion,
   wherein, the control board is disposed to be close to a side surface, which is farther from the protruding portion, of two side surfaces of the base portion facing each other.

* * * * *